United States Patent [19]
Watanabe et al.

[11] Patent Number: 5,481,882
[45] Date of Patent: Jan. 9, 1996

[54] LATENT HEAT ACCUMULATION SYSTEM

[75] Inventors: Yutaka Watanabe; Takayuki Hachimonji, both of Yokohama; Katsuya Yamashita; Sanae Sekita, both of Tokyo; Tsuyoshi Noma, Yokohama, all of Japan

[73] Assignee: Kabushiki Kaisha Toshiba, Kawasaki, Japan

[21] Appl. No.: 417,470

[22] Filed: Apr. 5, 1995

Related U.S. Application Data

[63] Continuation of Ser. No. 22,556, Feb. 25, 1993, abandoned.

[30] Foreign Application Priority Data

| Feb. 28, 1992 | [JP] | Japan | 4-043720 |
| Mar. 5, 1992 | [JP] | Japan | 4-048153 |
| Apr. 1, 1992 | [JP] | Japan | 4-078112 |

[51] Int. Cl.$^6$ ........................ F25C 3/00
[52] U.S. Cl. ............ 62/70; 62/59; 62/534; 165/104.22
[58] Field of Search ............... 165/909, 902, 165/104.25, 104.22, 104.21, 104.17, 104.11, 10; 62/70, 59, 534

[56] References Cited

U.S. PATENT DOCUMENTS

| 2,996,894 | 8/1961 | Shade | 165/104.17 |
| 4,408,654 | 10/1983 | Doornernik | 165/104.17 |
| 4,840,652 | 6/1989 | Simon et al. | 62/534 |

FOREIGN PATENT DOCUMENTS

| 25664 | 3/1981 | Japan . | |
| 147234 | 6/1989 | Japan | 62/59 |
| 203832 | 8/1989 | Japan | 62/59 |
| 7834 | 1/1991 | Japan | 62/59 |
| 59335 | 3/1991 | Japan | 62/59 |
| 1620792 | 1/1991 | U.S.S.R. | 62/59 |

*Primary Examiner*—John Rivell
*Assistant Examiner*—Christopher Atkinson
*Attorney, Agent, or Firm*—Oblon, Spivak, McClelland, Maier & Neustadt

[57] ABSTRACT

A latent heat accumulation system uses latent heat for air-conditioning. The latent heat accumulation system includes a tank, supplying section, injecting section, drawing section and collecting section. The tank has a liquid storing section for storing Fluorinate (trade name) in the lower portion thereof, storing water which is cooled by ice via a boundary surface with Fluorinate in the middle portion thereof and storing the ice together with the water in the upper portion thereof. The supplying section supplies the water into the liquid storing section. The injecting section injects Fluorinate cooled to a preset temperature into the water stored in the liquid storing section. The drawing section draws out the water which is stored in the liquid storing section and cooled by the ice to the exterior of the tank as an air-conditioning heat accumulation medium. The collecting section collects a mixed fluid of the water and Fluorinate from the lower portion of the liquid storing section.

2 Claims, 20 Drawing Sheets

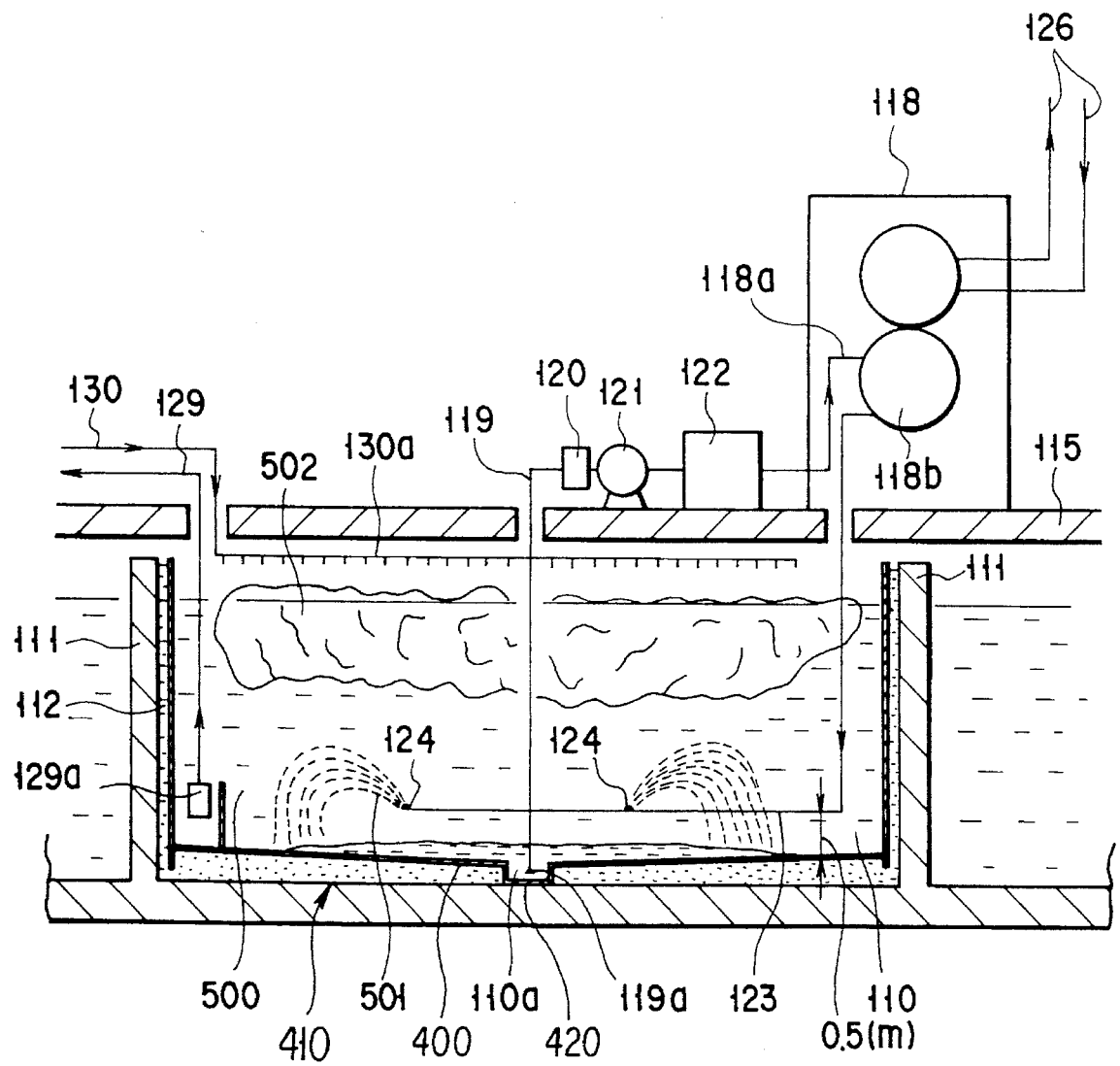
F I G. 10

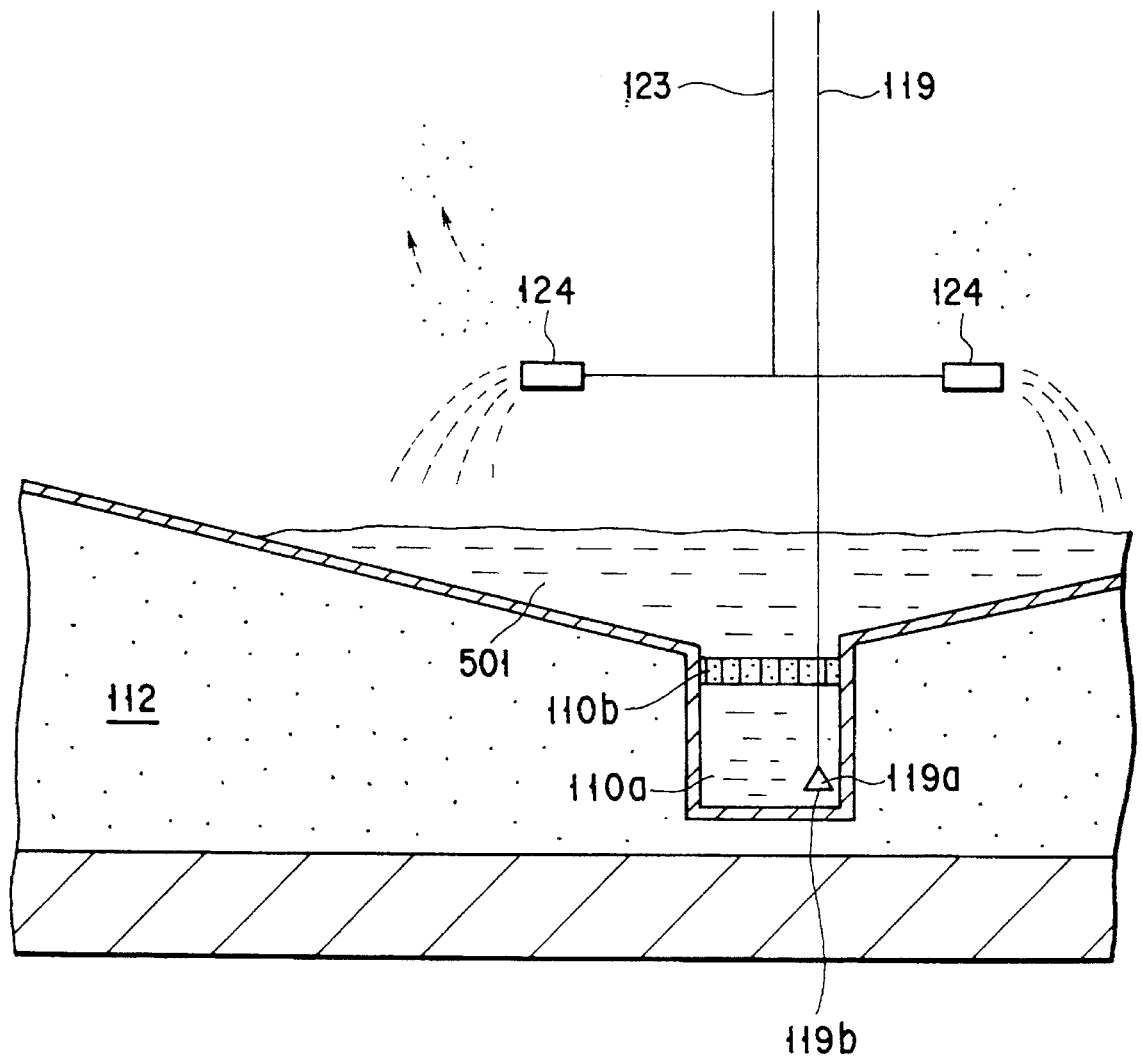
F I G. 11

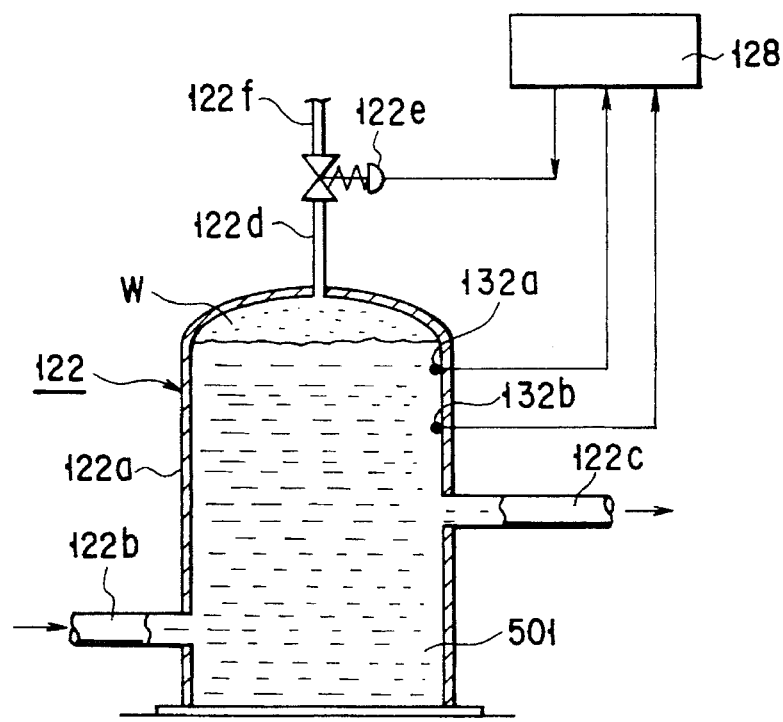
F I G. 12
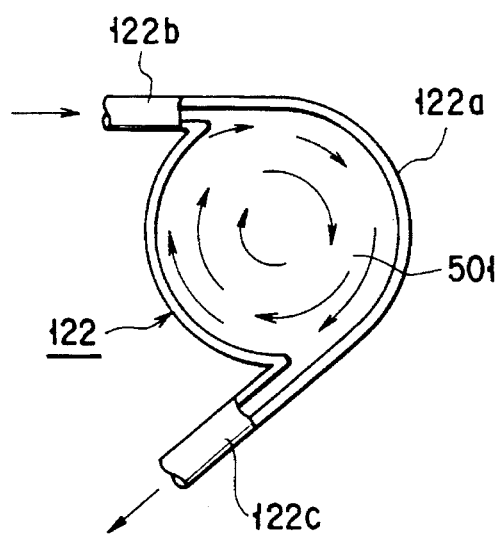
F I G. 13

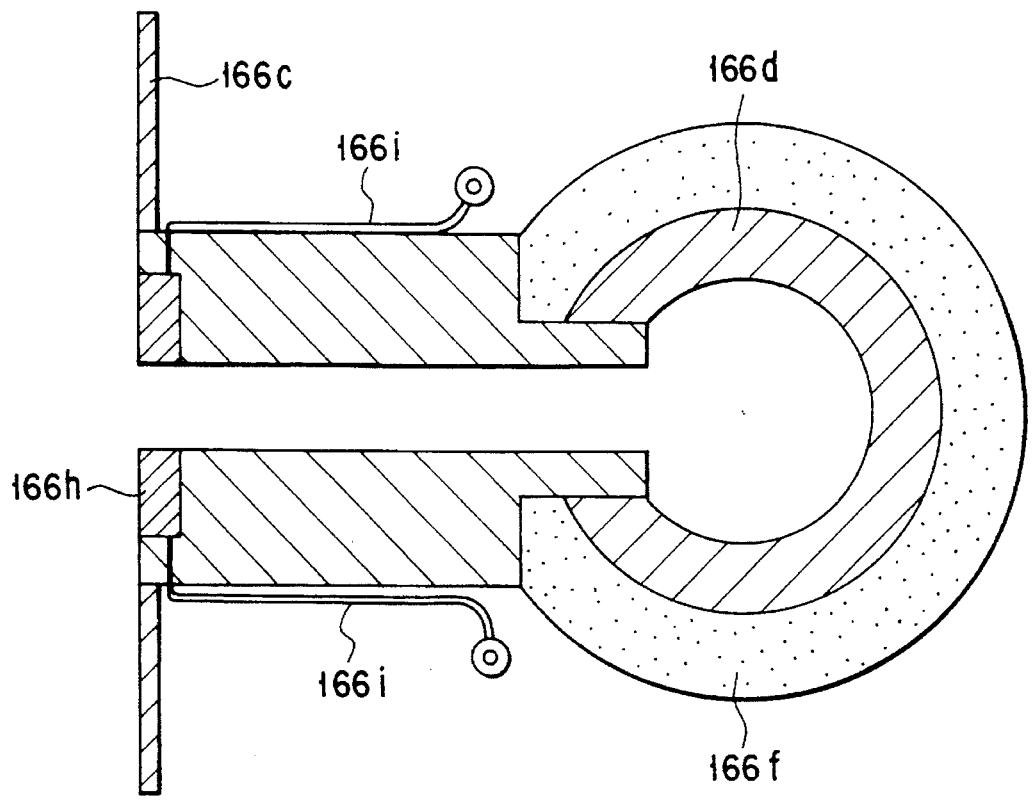
F I G. 16
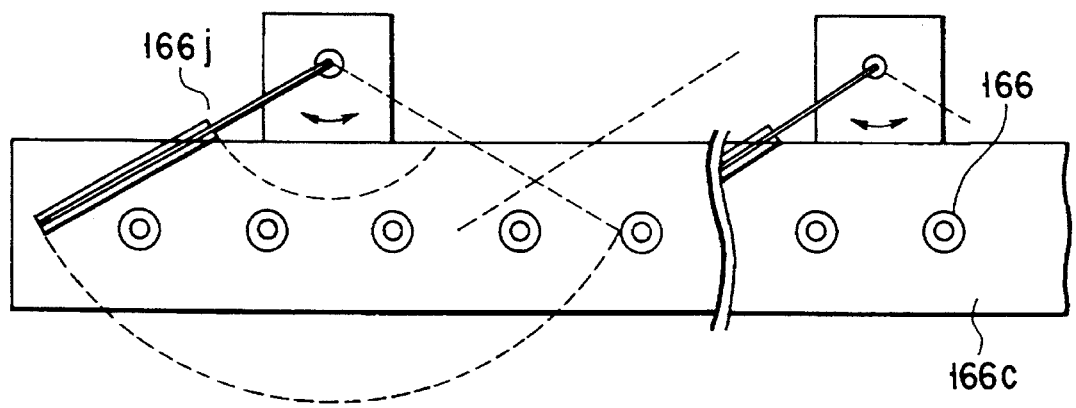
F I G. 17

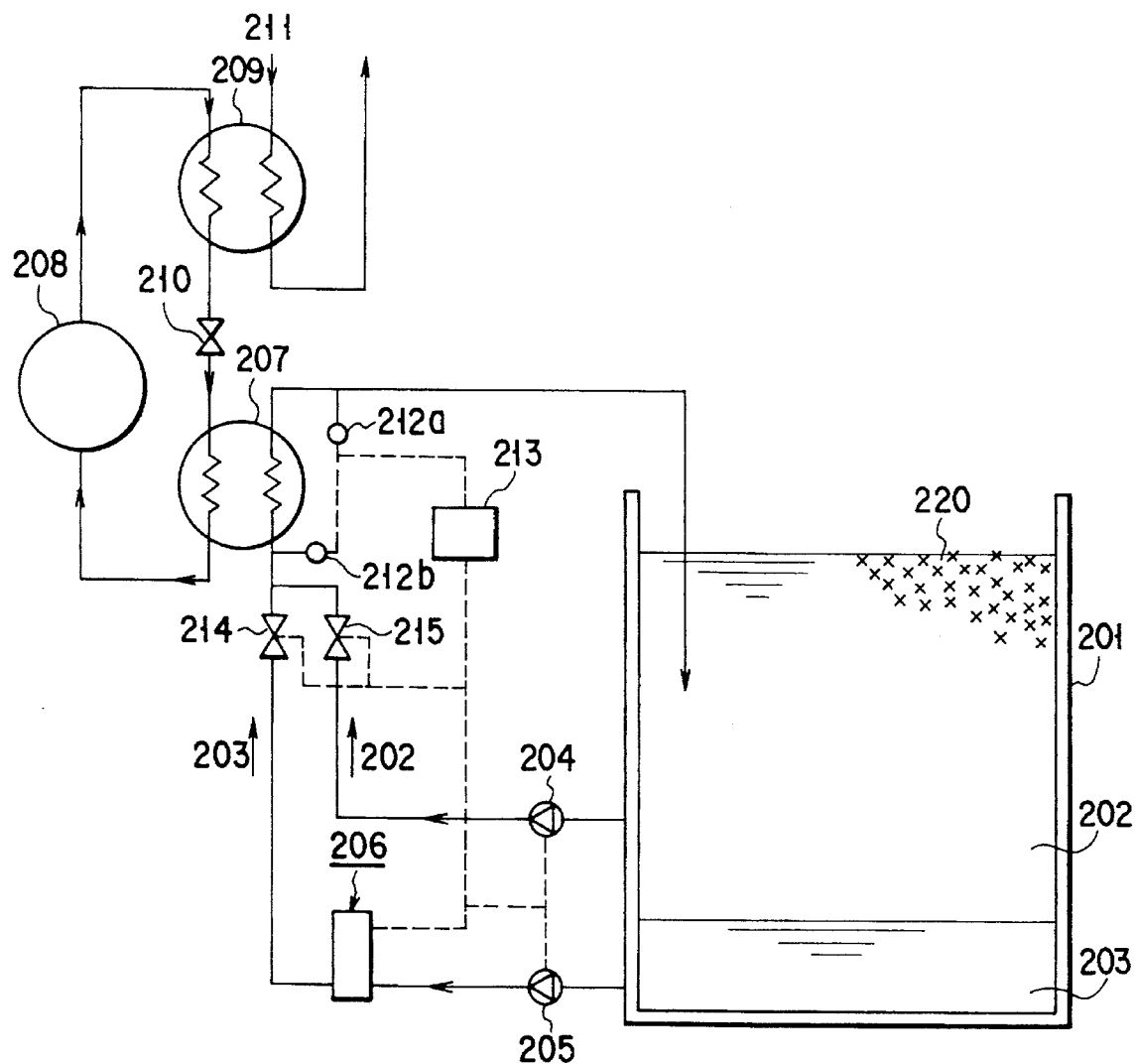
F I G. 18

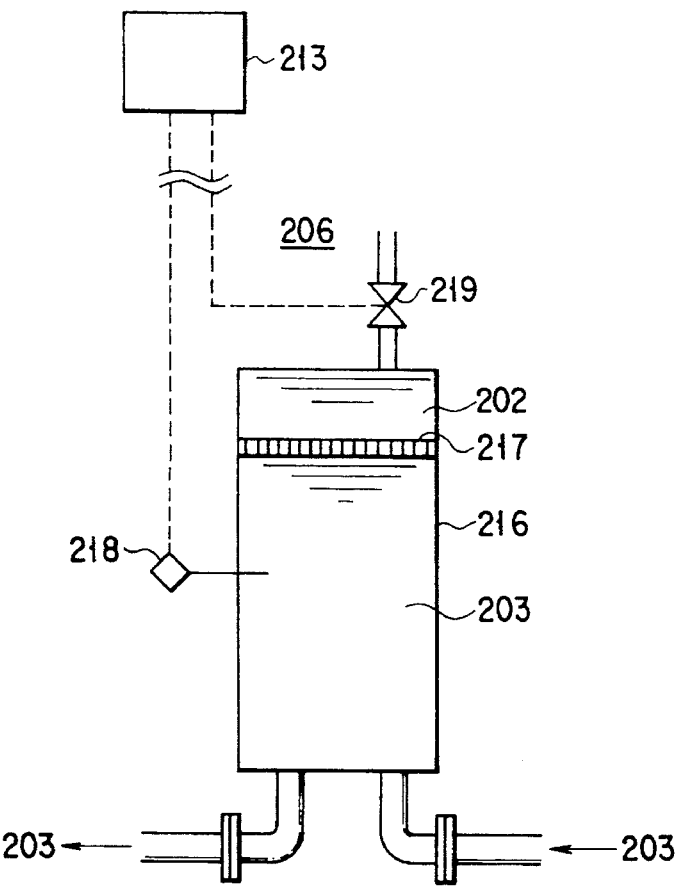
F I G. 19
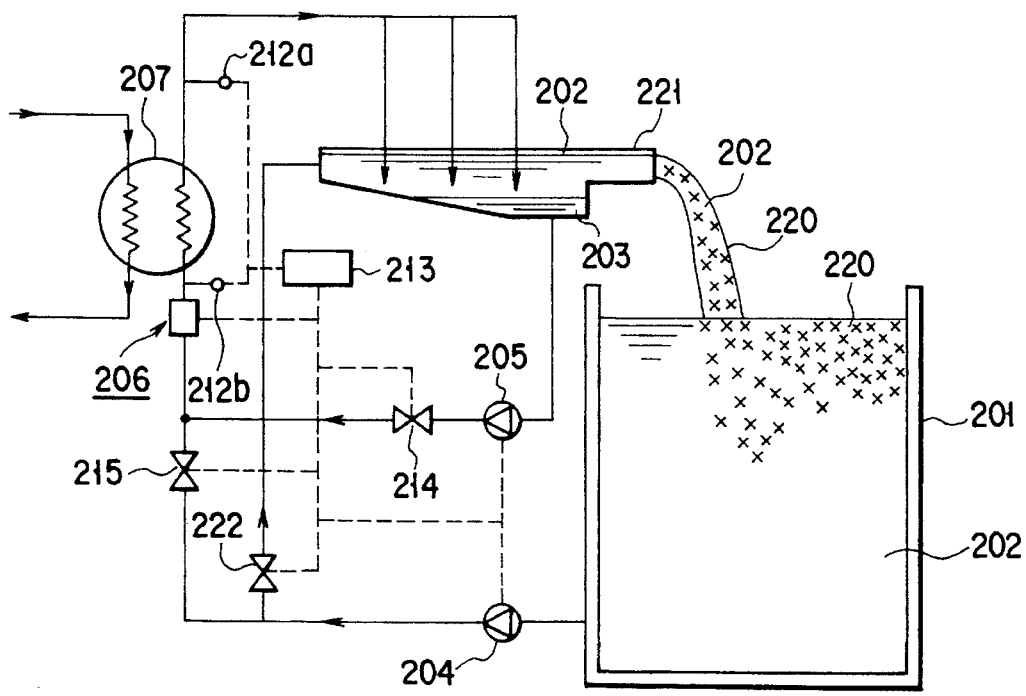
F I G. 20

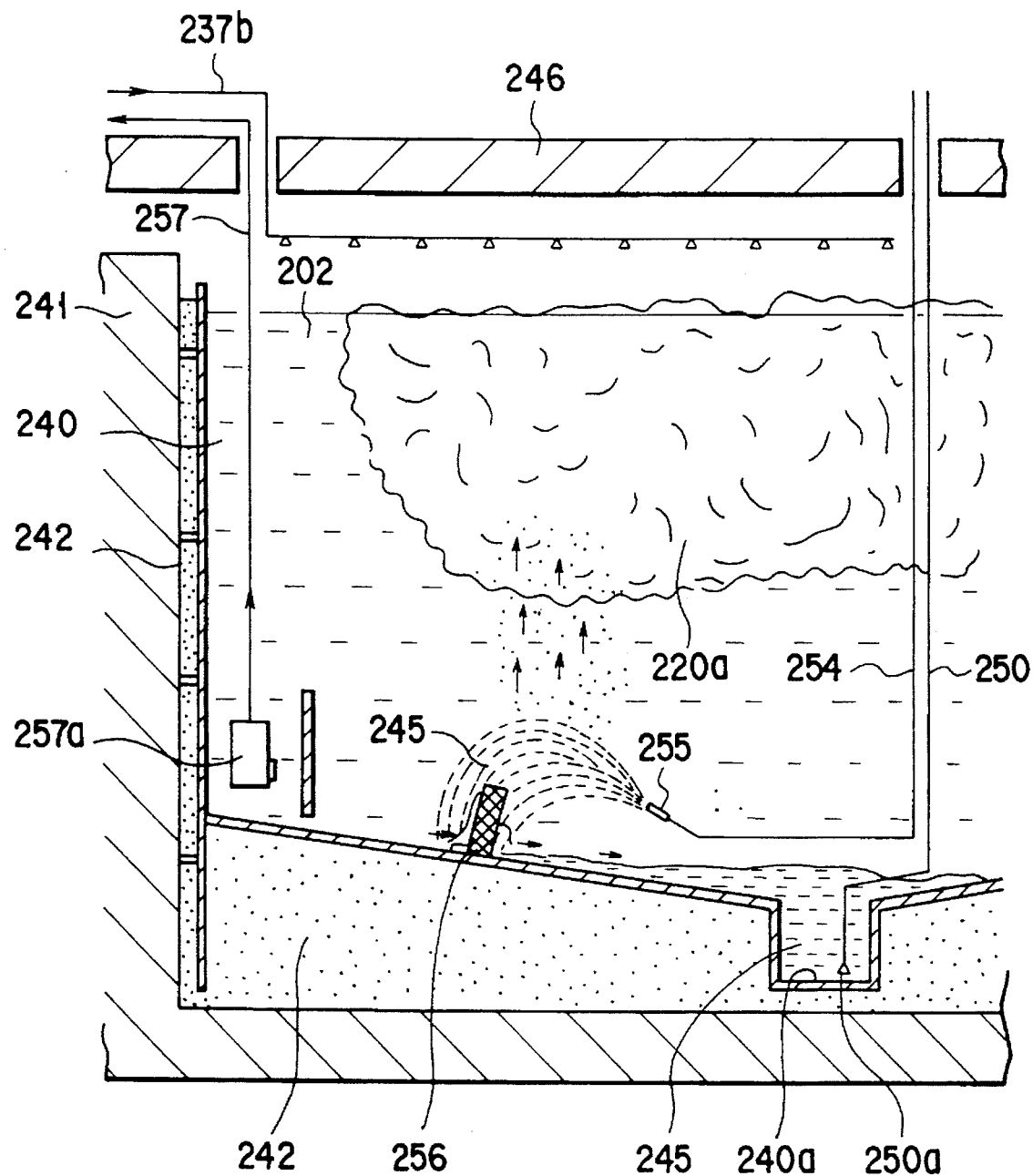
F I G. 22

LATENT HEAT ACCUMULATION SYSTEM

This application is a continuation of application Ser. No. 08/022,556, filed on Feb. 25, 1993, now abandoned.

BACKGROUND OF THE INVENTION

Description of the Related Art

Recently, it is proposed to use a heat accumulation type air-conditioning system for creating a latent heat accumulation medium such as cold water or hot water by driving a heat pump (refrigerator) by utilizing cheap electric power during the nighttime hours and mainly using the latent heat accumulation medium for an air-conditioning system for cooling during the daytime hours. The air-conditioning system is an economically improved air-conditioning equipment and can be suitably used as air-conditioning equipment disposed in a multistoried building, industrial plant, or large-scale regional heat supplying plant. Further, in recent years, the cooling load in the daytime hours in summer is rapidly increasing. Therefore, a stable supply of electric power cannot sometimes be attained. The above air-conditioning system which can reduce the electric power consumption in the daytime hours is of great importance in the stable supply of electric power.

This type of heat accumulation system using ice is generally used for air conditioning. This type of heat accumulation system utilizes water as a latent heat accumulation medium (first liquid). The water is used to continuously make sherbet-state ice with high efficiency. That is, a heat accumulation refrigerant (second liquid) cooled to a temperature equal to or lower than 0° C. is used as a cooling medium. The heat accumulation refrigerant is mainly an oily liquid (non-freezing liquid). The heat accumulation refrigerant is injected into water and brought into direct contact with water to effect the heat exchange and make ice.

Therefore, in the above latent heat accumulation system, the heat transfer efficiency is extremely high and fine ice particles can be obtained. The fine ice particles move upward due to the buoyancy thereof. Thus, the non-freezing liquid is always set in contact with water at 0° C. and the ice making operation is repeated. Therefore, the ice making efficiency is high.

As a conventional latent heat accumulation system in which sherbet-state ice is made by direct contact, a latent heat accumulation system shown in FIG. 1 cited from U.S. Pat. No. 2,996,894 or a latent heat accumulation system shown in FIG. 2 cited from Japanese Patent Disclosure No. 2-97845 are provided, for example.

The latent heat accumulation system shown in FIG. 1 includes a container 10A, oil 10B, water 10C and ice 10D stored in the container 10, nozzle 10E, oil circulating system 10F, refrigerator 10G, pump 10H, stirrer 10I, a cold fluid discharge portion 10J and the like.

The latent heat accumulation system shown in FIG. 2 includes an ice making container 20A, heat storage tank 20B, water 20C, oil 20D having a small specific gravity, oil 20E having a large specific gravity, ice 20F, communicating pipe 20G, pump 20H, refrigerator 20I, small-specific-gravity oil circulating pipe 20J, a small-specific-gravity oil return pipe 20K, water return pipe 20L, float 20M, pump 20N and the like.

In the latent heat accumulation system shown in FIGS. 1 and 2, water is used as the first liquid and an oily liquid which is lighter than water is used as the second liquid. The second liquid which is cooled by the refrigerator is fed via the pump and pipe and injected into water stored in the bottom portion of the water reservoir.

However, with the above structure, since the density of the second liquid which is a non-freezing liquid is almost the same as that of water or the second liquid is lighter than water, the oily liquid will be mixed into the ice made in the sherbet state. As a result, it becomes difficult to draw out cold water directly from the water tank and supply the cold water to the cooling load. Further, it becomes necessary to use a cold transferring heat exchanger in order to transfer the cold from the water tank. Therefore, the requirements for drawing out the cold in a short period of time, making the construction of the device simple and directly drawing out water cannot be met with full satisfaction.

As a latent heat accumulation system made for solving the above problem, a system shown in FIG. 3 cited from Japanese Patent Disclosure No. 56-25664 is proposed, for example. The latent heat accumulation system shown in FIG. 3 includes a water tank 30A, water 30B, oil 30C, an oil supplying device 30D, separation film 30E, return port 30F for circulating water, pump 30G, refrigerator 30H, outlet port 30I for cold water and the like.

In the latent heat accumulation system of FIG. 3, a first liquid (water) is stored in the water tank. A second liquid (which is an oily liquid and is lighter than water and ice) is injected from the bottom portion of the water tank into the first liquid in the upward direction. The second liquid is cooled to a temperature lower than the freezing or solidifying point of the first liquid (water) by the refrigerator. Thus, heat exchange occurs when the second liquid is brought into direct contact with the water. The water is partly frozen and the second liquid moves upwardly in the partly frozen water. In this respect, the condition is the same as that of FIG. 1. Further, the separation film (corelesser) is disposed in the upper portion. The separation film permits the passage of the second liquid (oily liquid) but inhibits the passage of ice. Thus, the amount of use of the oily liquid or second liquid is relatively reduced.

The outlet port is disposed below the separation film. In the bottom portion of the water tank, the cold water outlet port is disposed. With this arrangement, the first liquid which is warmed by absorbing heat from the cooling load can be circulated. Further, it is possible to draw out water directly from the water tank.

However, with the above structure, a problem exists in that emulsion of the second liquid occurs in the process of injecting into the water and a further problem that the second liquid flows into the air-conditioning load may also occur. That is, separation of the first liquid from the second liquid is imperfect.

In general, when an oily liquid is used as the second liquid, the second liquid injected into the first liquid is set into the emulsion state or turbid state. For this reason,, it sometimes takes a long time for the second liquid to be separated from the first liquid. Therefore, it may become necessary to draw out the second liquid by use of a heat exchanger, making it necessary to use a large-scale device.

For the above-described reason, the above system cannot be conveniently used and is not generally accepted by the users although the ice making efficiency thereof is high.

In a heat accumulation system shown in FIG. 4 cited corresponding to Japanese Patent Disclosure No. 1-244225, a heat accumulation system shown in FIG. 5 corresponding to Japanese Patent Disclosure No. 2-110231 and a heat accumulation system shown in FIG. 6 corresponding to Japanese Patent Disclosure No. 3-140767, a liquid having a specific gravity larger than that of the first liquid is used as the second liquid.

The heat accumulation system shown in FIG. 4 includes an ice making tank 40A, heat accumulation tank 40B, water 40C, heat exchanger 40D, water supply pipe 40E, ice 40F, circulating system 40G, ice making liquid 40H and the like.

The heat accumulation system shown in FIG. 5 includes an ice making tank 50A, heat accumulation tank 50B, water 50C, oil 50D, air 50E, ice 50F, circulating system 50G, return path 50H, communicating pipe 50I and the like.

The heat accumulation system shown in FIG. 6 includes a water tank 60A, water 60B, oil 60C, ice 60D, cold transferring section 60E, cooling system 60F and the like.

In the heat accumulation systems shown in FIGS. 4 to 6, the second liquid is stored in the bottom portion of the water tank. The second liquid is cooled by a heat exchanger or refrigerator. Water or the first liquid is injected into the second liquid which is cooled from the bottom portion of the water tank (FIGS. 4 and 6). The boundary portion between the first and second liquids is stirred to change ice formed in the boundary portion into fine ice particles (FIG. 5). In this system, the temperature of the second liquid introduced into the refrigerator becomes relatively lower than that of the freezing or solidifying point (0° C. in the case of water) of the first liquid. Further, in the above systems, a problem occurs in that the freezing efficiency cannot be enhanced although a high heat transfer characteristic can be attained by the direct contact between the first and second liquids occurs.

In order to solve the above problem, a latent heat accumulation system shown in FIG. 7 cited from Japanese Patent Disclosure No. 3-140767 is proposed. The latent heat accumulation system shown in FIG. 7 includes a water tank 70A, water 70B, oil 70C, ice 70D, cold transferring section 70E, cooling system 70F and the like.

In the latent heat accumulation system shown in FIG. 7, the second liquid is collected from the bottom portion of the water tank. The second liquid is cooled to a temperature equal to or lower than the freezing or solidifying point of the first liquid (water) by the refrigerator. The cooled second liquid is poured from a portion in the air into the water tank. In this case, while the second liquid (oily liquid) which is heavier than water drops and is deposited in the water, it sufficiently exchanges heat with the water. The temperature of the second liquid is raised to substantially the water temperature by the time the second liquid is collected from the bottom portion of the water tank. Therefore, the freezing efficiency of the second liquid can be held high.

However, in this system, hard and heavy ice blocks are formed. Generally, such ice blocks are deposited in the boundary portion between the first and second liquids and cannot rise to the surface. The same problem occurs in the systems of FIGS. 4, 5 and 6.

SUMMARY OF THE INVENTION

An object of this invention is to provide a latent heat accumulation system which can be easily dealt with and can effectively accumulate latent heat obtained by heat exchange with high efficiency.

The above object can be attained by a latent heat accumulation system for injecting a second fluid which does not combine with a first fluid, has a specific gravity larger than that of the first fluid and is cooled to a preset temperature level into the first fluid to form a solid phase material of the first fluid by the solidification phenomenon of the first fluid and using the latent heat of the solid phase material to cool a object to be cooled, which comprises:

a tank for storing the second fluid in the lower portion thereof, storing the first fluid which is cooled by the solid phase material via a boundary surface with the second fluid in the middle portion thereof and storing the solid phase material of the first fluid together with the first fluid in the upper portion thereof;

a supply for supplying the first fluid into the tank;

an injector for injecting the second fluid which is cooled to the preset temperature level into the first fluid stored in the tank; and a drawing mechanism for drawing out the first fluid stored in the tank and cooled by the solid phase material to the exterior of the tank as a heat accumulation medium.

The above object can also be attained by a latent heat accumulation system for injecting a second fluid which does not combine with a first fluid, has a specific gravity larger than that of the first fluid and is cooled to a preset temperature level into the first fluid to form a solid phase material of the first fluid by the solidification phenomenon of the first fluid and using the latent heat of the solid phase material to cool a object to be cooled, which comprises:

a first tank for storing the second fluid in the lower portion thereof, storing the first fluid which is cooled by the solid phase material via a boundary surface with the second fluid in the middle portion thereof and storing the solid phase material of the first fluid together with the first fluid in the upper portion thereof;

a supply for supplying the first fluid into the first tank;

an injector for injecting the second fluid which is cooled to the preset temperature level into the first fluid stored in the first tank;

a second tank provided together with the first tank, for storing the solid phase material of the first fluid which has been stored in the first tank and is drawn out from the first tank; and a collector for collecting the second fluids from the lower portion of at least one of the first and second tanks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a cross sectional view showing the main portion of the latent heat accumulation system of the same embodiment;

FIG. 11 is an enlarged cross sectional view of a water tank shown in FIG. 10;

FIG. 12 is an enlarged cross sectional view of a refrigerant separation and collection device utilizing the centrifugal force shown in FIG. 10;

FIG. 13 is a partial cross sectional view of the refrigerant separation and collection device of FIG. 12 as viewed from the above;

FIG. 16 is a cross sectional view showing a second example of the construction of the outlet nozzle portion for refrigerant;

FIG. 17 is a cross sectional view showing a third example of the construction of the outlet nozzle portion for refrigerant;

FIG. 18 is a view showing the construction of one embodiment of this invention;

FIG. 19 is a view showing the construction of a separator used in the embodiment of this invention;

FIG. 20 is a view showing the construction of another embodiment of this invention;

FIG. 22 is an enlarged view of the main portion of the embodiment shown in FIG. 21;

DESCRIPTION OF THE PREFERRED EMBODIMENTS

Figure 1:
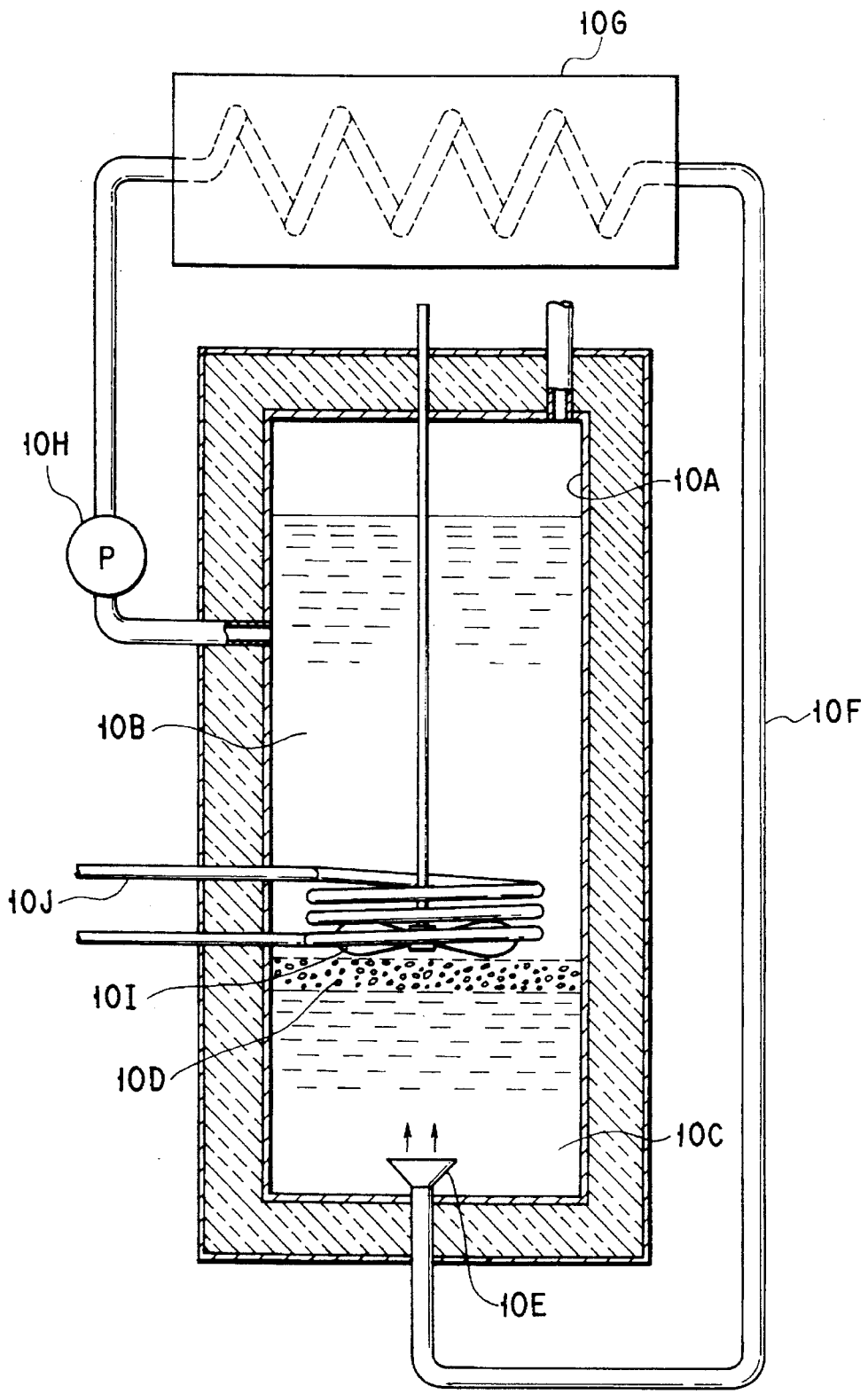
FIG. 1 is a view showing the first construction of a conventional direct contact type latent heat accumulation system using a non-freezing liquid which is not soluble in water.
Figure 2:
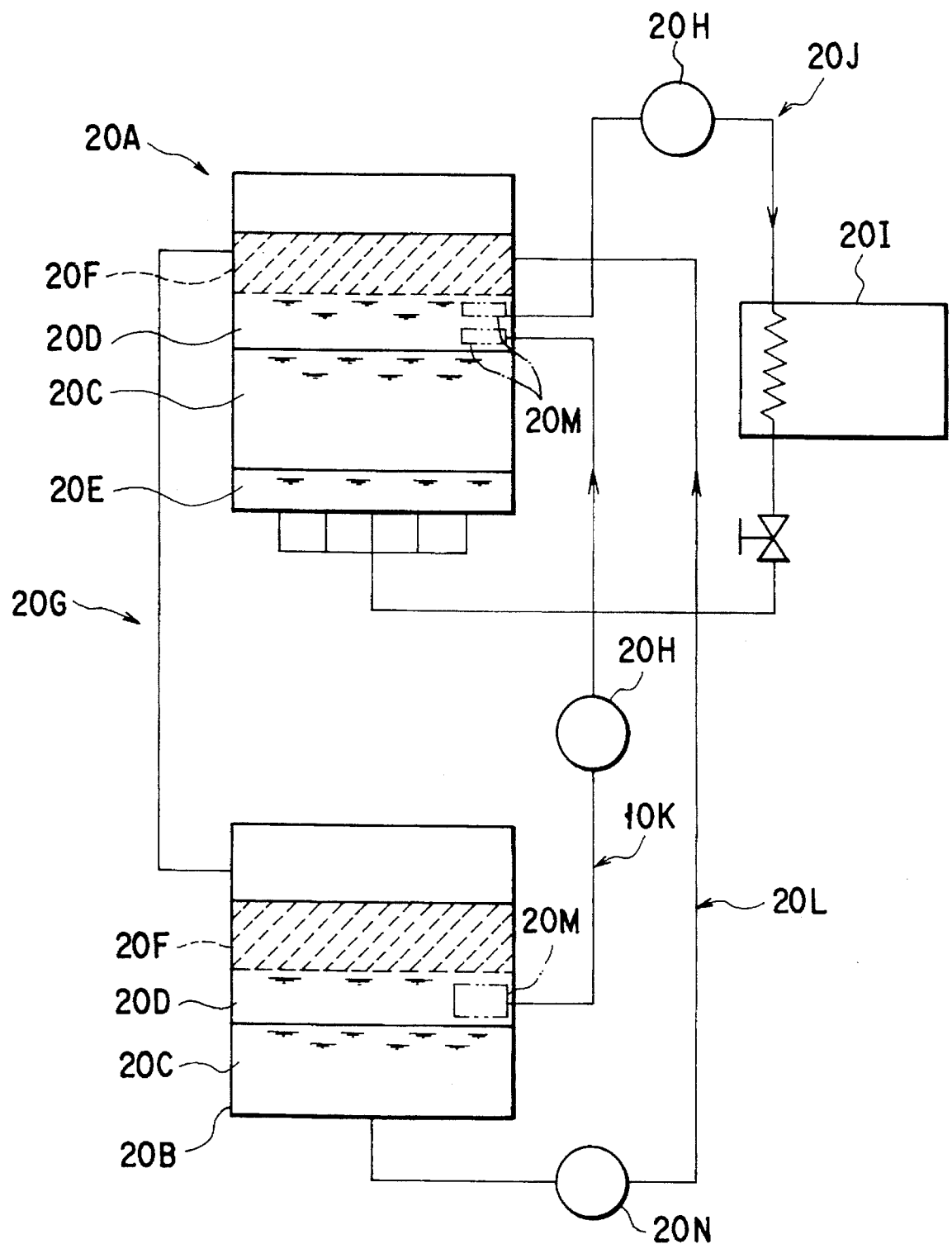
FIG. 2 is a view showing the second construction of the conventional direct contact type latent heat accumulation system.
Figure 3:
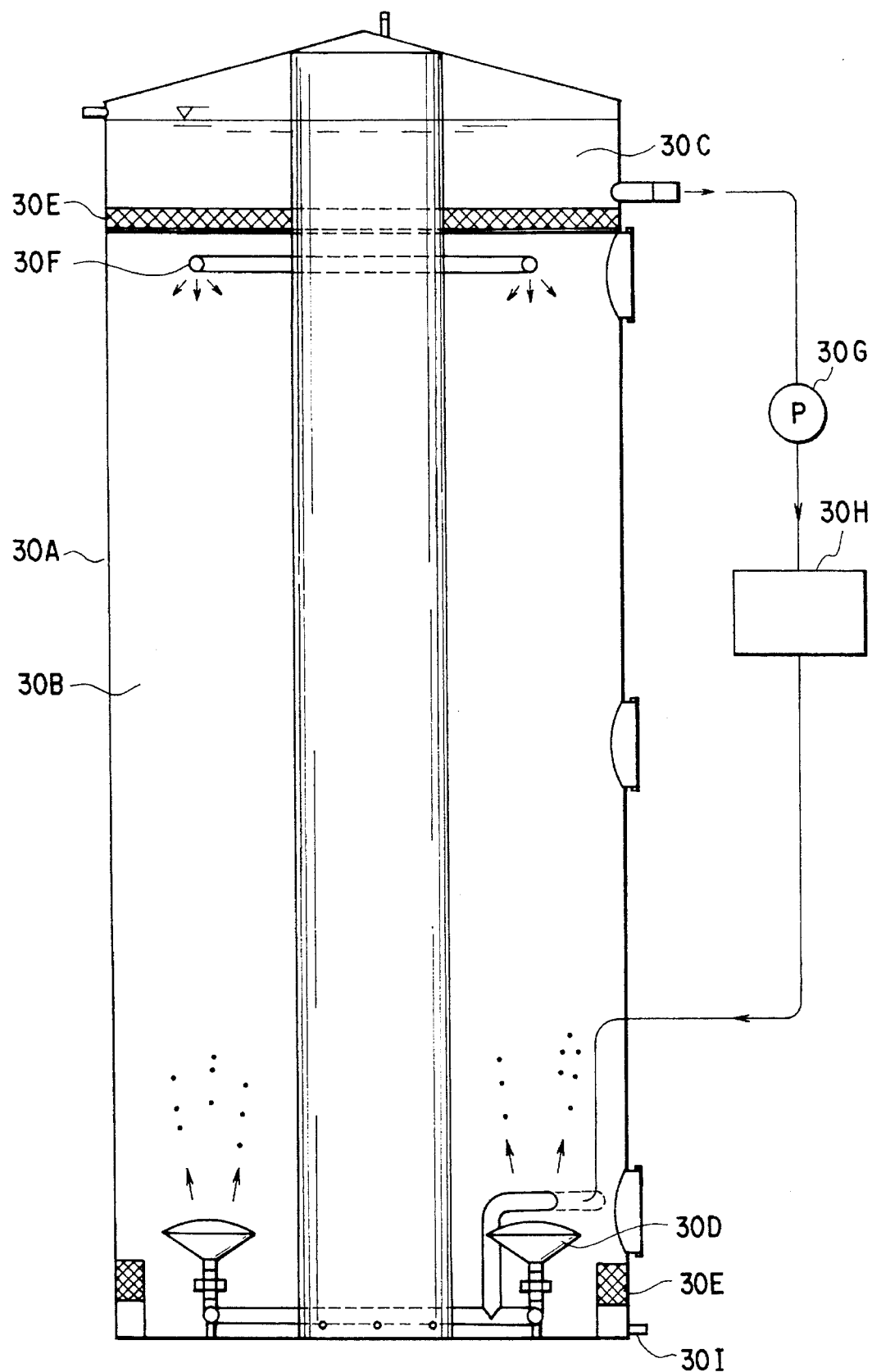
FIG. 3 is a view showing the third construction of the conventional direct contact type latent heat accumulation system.
Figure 4:
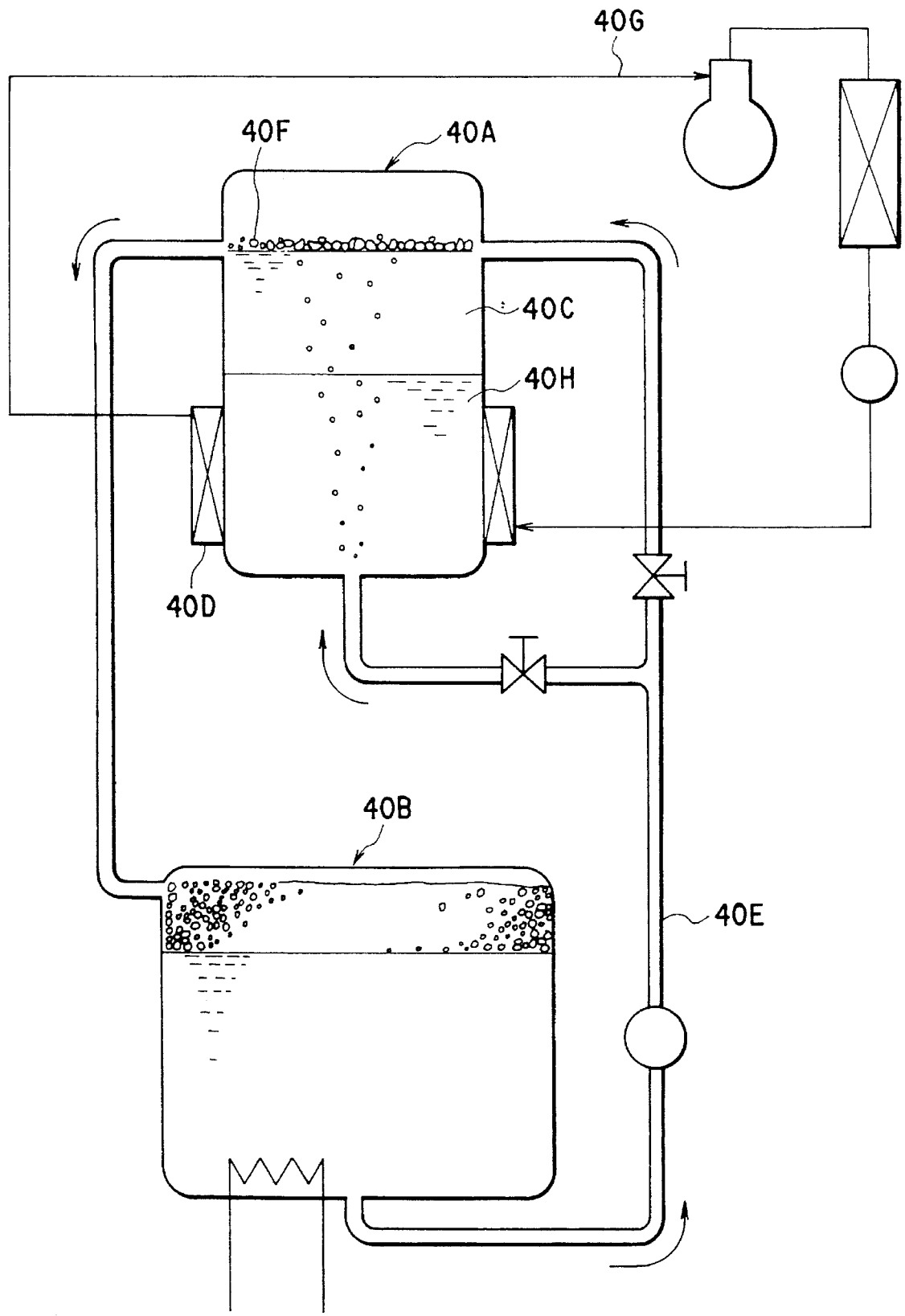
FIG. 4 is a view showing the fourth construction of the conventional direct contact type latent heat accumulation system.
Figure 5:
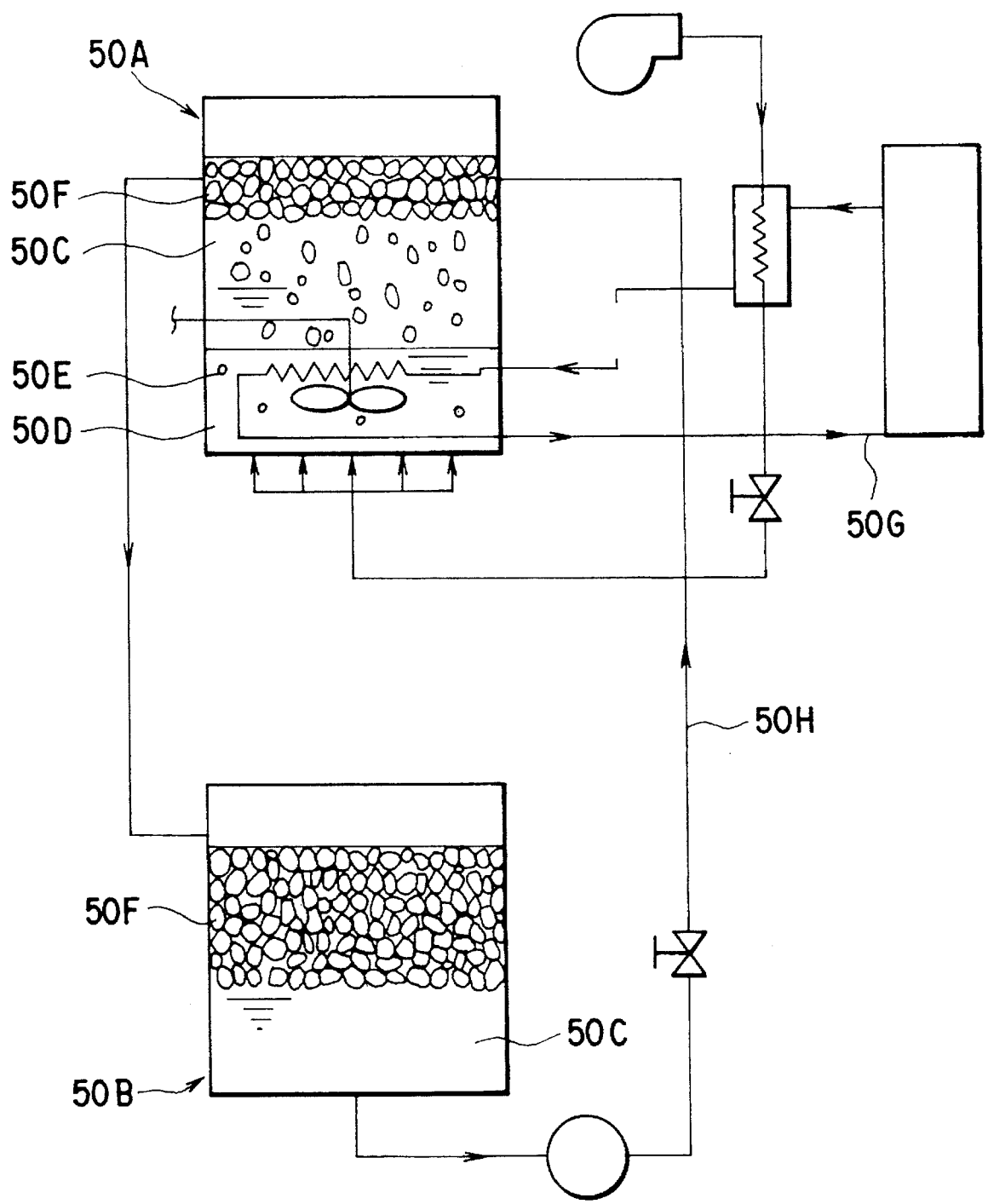
FIG. 5 is a view showing the fifth construction of the conventional direct contact type latent heat accumulation system.
Figure 6:
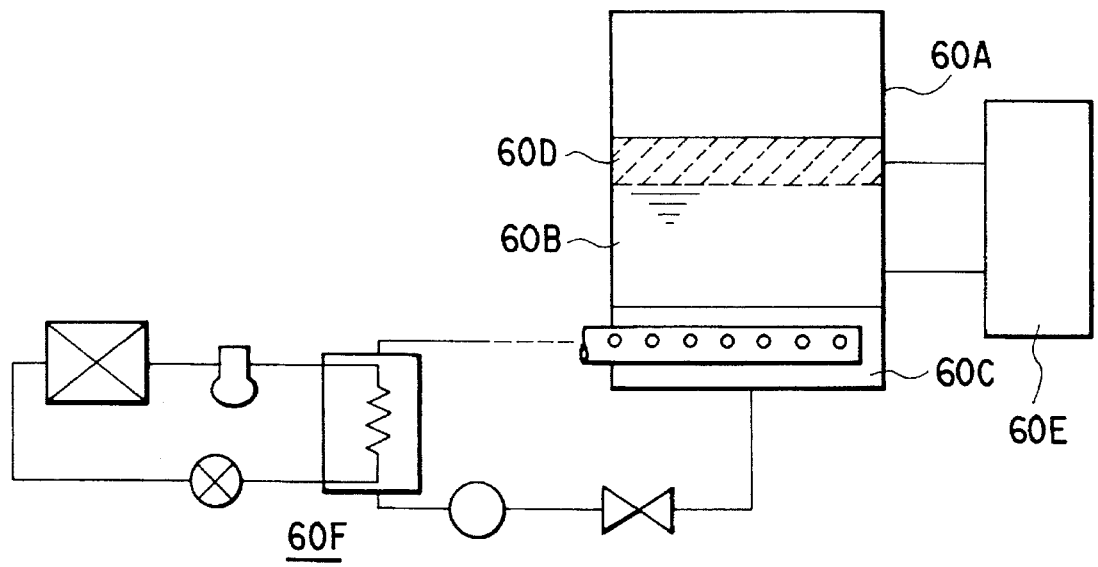
FIG. 6 is a view showing the sixth construction of the conventional direct contact type latent heat accumulation system.
Figure 7:
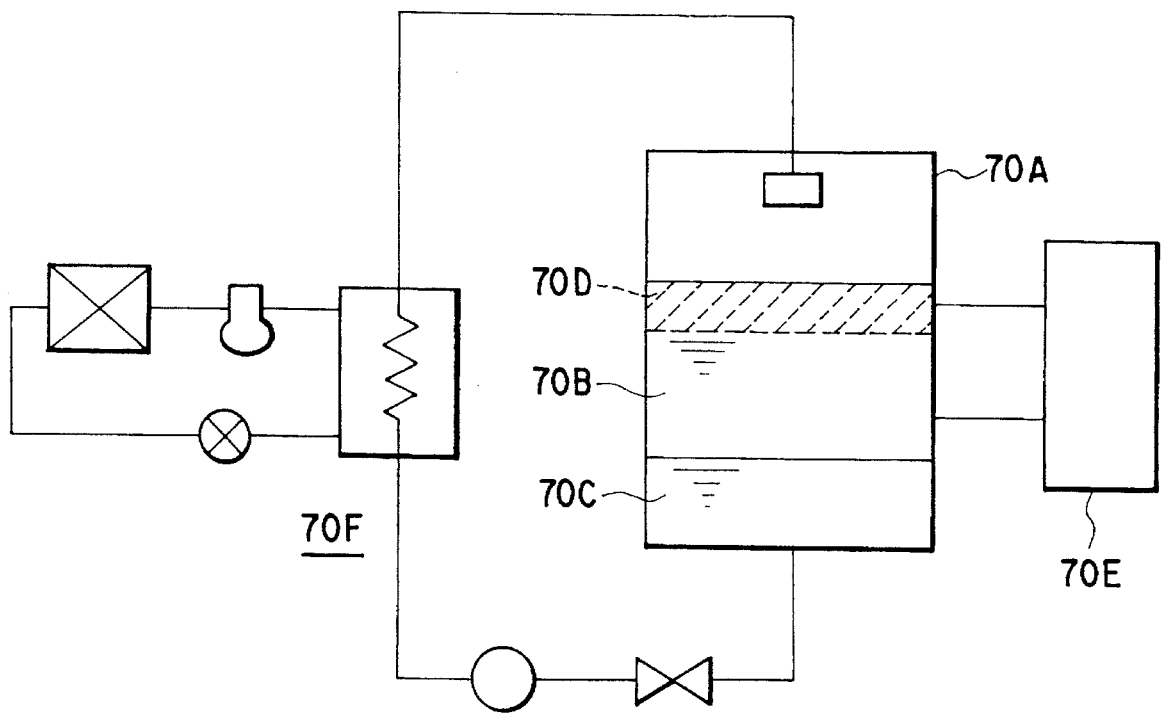
FIG. 7 is a view showing the seventh construction of the conventional direct contact type latent heat accumulation system.
Figure 8:
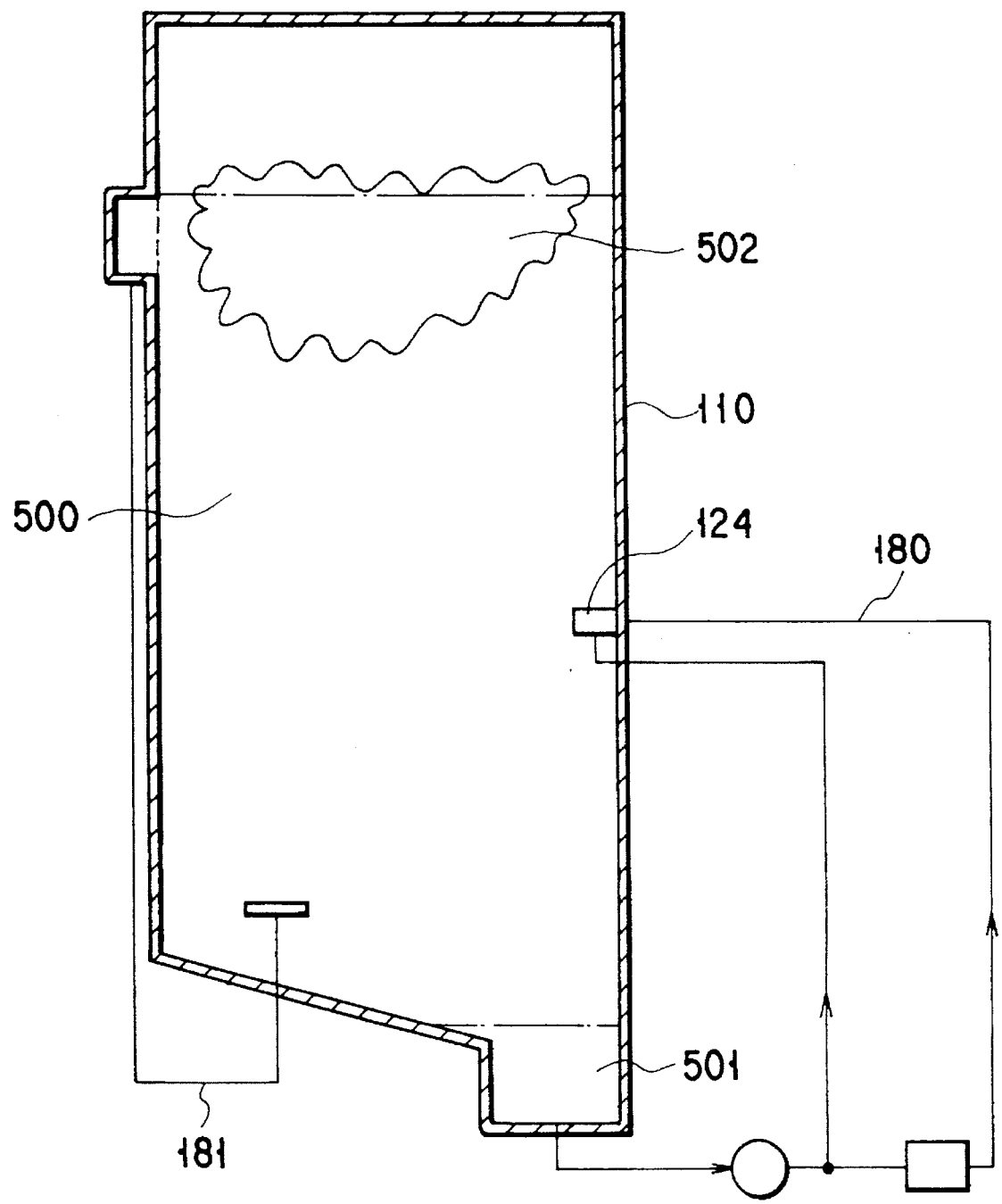
FIG. 8 is a view for illustrating the principle of this invention.

FIG. 8 is a view for illustrating the principle of a latent heat accumulation system according to this invention. The latent heat accumulation system includes a water tank 110 in which water 500, refrigerant (trade name: Fluorinate) 501 and ice 502 are stored. A refrigerant circulating system 180 and a water circulating system 181 are additionally provided for the water tank 110. The construction of FIG. 8 is used in the systems shown in FIGS. 8 to 26.

Figure 9:
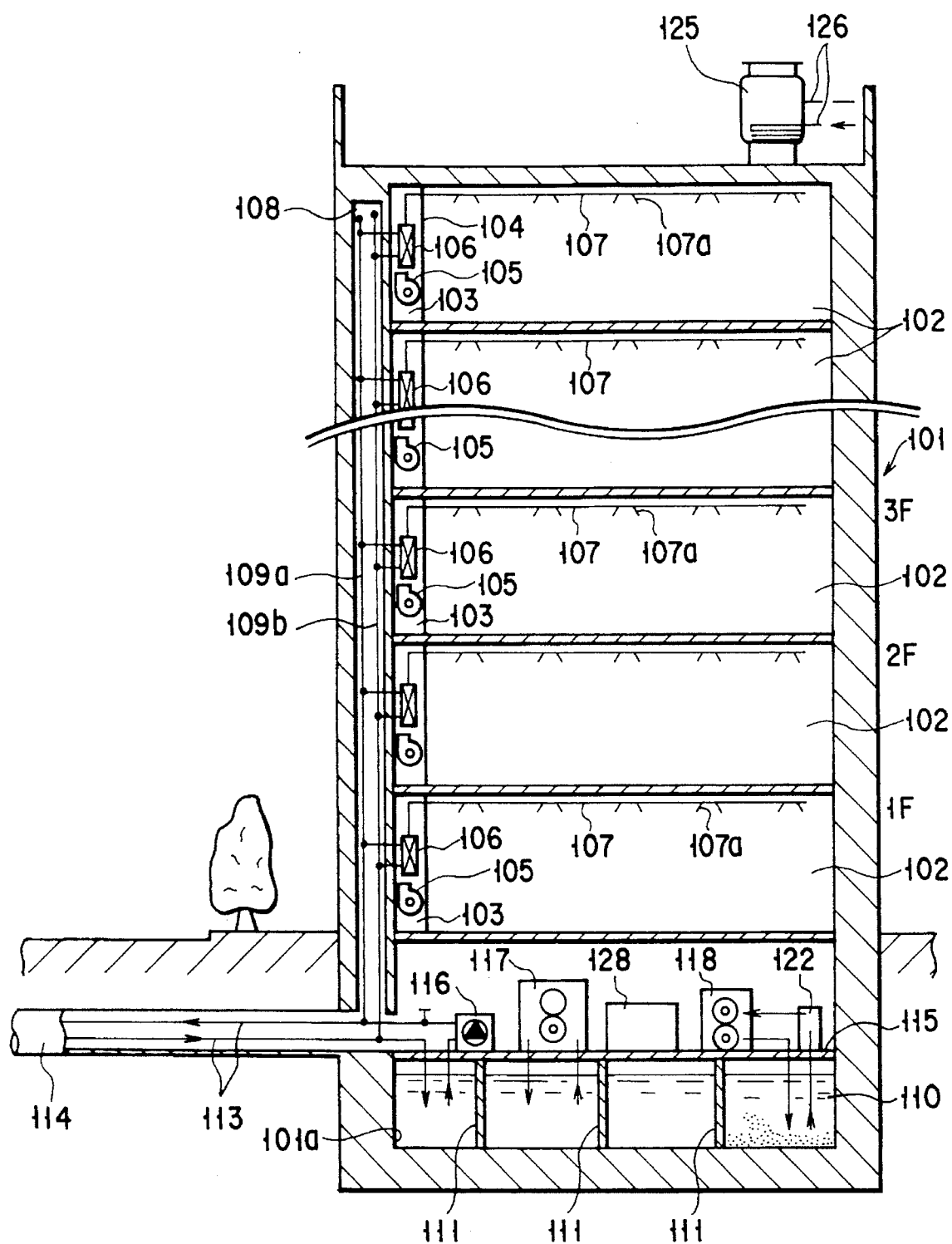
FIG. 9 is a cross sectional view of a latent heat accumulation system according to a first embodiment of this invention in a case where it is disposed in a regional heat supply plant installed in the basement of a multistoried building.

FIGS. 9 and 10 are views showing one embodiment of a latent heat accumulation system according to this invention. As shown in FIG. 9, storage chambers 103 are defined by partition boards 104 in respective rooms 102 on the respective stories of a multistoried building 101. Indoor heat exchangers 106 having cooling fans 105 are disposed in the respective storage chambers 103. Further, cold wind supply pipes 107 having air blow-off ports 107a are connected to the respective indoor heat exchangers 106. The cold wind supply pipes 107 are arranged to extend along the ceiling sides of the respective rooms 102. A through air hole is formed in a vertical direction in that portion of the multistoried building 101 which lies near the storage chambers 103. A cold water supply pipe 109a and return pipe 109b are laid in the through air hole 108. The supply pipe 109a and return pipe 109b are connected to all of the indoor heat exchangers 106. Each of the indoor heat exchangers 106 creates cold air by the heat exchange between the cold water and air by means of the cooling fan 105. The cold air is supplied into the room 102 via the cold wind supply pipe 107 to lower the room temperature to a preset level. The cold water subjected to the heat exchange is returned to the water tank 110 installed in the basement 101a of the multistoried building 101 as will be described later via the return pipe 109b.

As shown in FIG. 10, the basement 101a of the multistoried building 101 is divided by partition boards 111 each having a communication hole. Thus, the water tank 110 has a plurality of water tank units. The bottom portion of the water tank 110 is formed to have inclined surfaces 400 of a hopper 410 which extend downwardly from the peripheral portions towards the center and a concave portion is formed as a storage portion 110a for a second liquid 501 in the central bottom portion. A storage mechanism 420 is located at the base of the hopper 410 as shown in FIG. 10. Heat insulation sheets 112 are attached to the bottom and inner wall portions of the water tank 110 and the partition boards 111.

As shown in FIG. 9, the water tank 110 is connected to a commercial water pipe 113 via a closing valve. The commercial water pipe 113 is disposed in the underground multi-purpose duct buried in the ground outside the building 101.

Cold water 500 or the first liquid and a refrigerant 501 or the second liquid having a larger specific gravity are mixed and stored in the water tank 110. In this embodiment, as the refrigerant 501, a refrigerant having a specific gravity which is more than 1.5 times that of the first liquid and a solidifying point lower than the first liquid is used, for example. As shown in FIGS. 10 and 11, when the refrigerant 501 is deposited on the bottom portion of the water tank 110, it flows towards the storage portion 110a along the inclined surface of the bottom portion of the water tank 110 by its own weight and remains there.

A base plate 115 is horizontally disposed on the upper portion of the basement 101a of the multistoried building 101 to cover the water tank 110. A pump 116 and heat pump 117 constructing a cold/warm water supplying system are disposed on the base plate 115. The pump 116 and heat pump 117 are connected to the supply pipes 109a and 109b via a switching valve.

Further, a refrigerating machine 118 is disposed on the base plate 115. The inlet port 118a of the refrigerating machine 118 is connected to a supply pipe 119. The supply pipe 119 has an inlet port 119a for refrigerant. The inlet port 119a is formed in communication with the storage portion 110a formed in the bottom portion of the water tank 110. As shown in FIG. 11, a vortex preventing portion 110b formed of a porous plate is disposed over the storage portion 110a. The vortex preventing portion 110b is provided to prevent a vortex from being generated by the refrigerant 501 flowing into the storage portion 110a. Further, a guide 119b for defining the intake direction is disposed on the inlet port 119a provided at the end portion of the supply pipe 119 so as to prevent the cold water 500 from being mixed into the refrigerant 501.

The supply pipe 119 is connected to the inlet port 118a of the refrigerating machine 118. A strainer 120, suction pump 121 and water/liquid separation device 122 are connected to the supply pipe 119 in this order.

The refrigerating machine 118 has an evaporator 118b. A delivery pipe 123 is connected to the evaporator 118b. The delivery pipe 123 is laid in the cold water 500 in the water tank 110. The end portion of the delivery pipe 123 is held in a horizontal position near the bottom surface of the water tank 110. A plurality of injection nozzles 124 are formed on the end portion of the delivery pipe 123.

Further, as shown in FIG. 9, an air-conditioning control device 128 is disposed on the base plate 115 near the refrigerating machine 118. The air-conditioning control device 128 controls the air-conditioning operation in the multistoried building 101 and various instruments in the heat supplying plant.

A cold water supply pipe 129 has an intake port 129a for drawing cold water. The intake port 129a is disposed in the cold water in the water tank 110. The cold water supply pipe 129 is connected to the lower end portion of the supply pipe 109a shown in FIG. 9 via an open/closing valve (not shown).

A returning pipe 130 is connected to the lower end portion of the return pipe 109b shown in FIG. 9. The returning pipe 130 is connected to a sprinkling pipe 130a disposed in a space between the water tank 110 and the base plate 115. The sprinkling pipe 130a has a plurality of cold water discharging ports for returning cold water into the water tank 110.

The refrigerating machine 118 is controlled according to the operation control of the air-conditioning control device 128. Control operation of the air-conditioning control device 128 is effected so as to supply the refrigerant to a plurality of water tank units of the water tank 110 simultaneously or with time delay.

The water/liquid separation device 122 is constructed as shown in FIGS. 12 and 13. That is, the water/liquid separation device 122 has a tank 122a. The tank 122a has an inlet port 122b and an outlet port 122c positioned lower than the inlet port 122b. Further, an exhaust port 122d is formed in the upper surface portion of the tank 122a. The inlet port 122b of the tank 122a is connected to the suction pump 121 via a communicating pipe. The outlet port 122c is connected to the inlet port 118a of the refrigerator 118. Further, the exhaust port 122d is connected to a drain pipe 122f for draining cold water via an electromagnetic valve 122e. A pair of electrical resistance sensors 132a and 132b are disposed on the inner wall of the tank 122a in position higher than the inlet port 122b and placed apart from each other in the vertical direction. The electrical resistance sensors 132a and 132b are used to detect the boundary between the cold water 500 and the refrigerant 501 by utilizing the difference between the electrical resistances thereof. Detection signals from the electrical resistance sensors 132a and 132b are supplied to the air-conditioning control device 128 via respective lines.

The air-conditioning control device 128 controls the open/closing position of the electromagnetic valve 122e according to the detection signals of the electrical resistance sensors 132a and 132b to control the displacement of cold water so as to separate the refrigerant 501 and the cold water 500 in the tank 122a from each other at the reference boundary surface. When the water is accumulated separately from the refrigerant in the tank 122a of the water/liquid separation device 122, the position of the boundary surface between the water and refrigerant can be detected by the electrical resistance sensors 132a and 132b. The detection signals of the electrical resistance sensors 132a and 132b are supplied to the air-conditioning control device 128 which opens the electromagnetic valve 122e according to the detection signals. Therefore, the water in the tank 122a is forcedly moved upwardly by the pressure of the refrigerant newly drawn into the tank 122a and is drained via the drain pipe 122f. As a result, the boundary surface between the cold water and refrigerant rises, and when the reference boundary surface is detected by the electrical resistance sensors 132a and 132b, the detection signals of the electrical resistance sensors 132a and 132b are supplied to the air-conditioning control device 128 which in turn closes the electromagnetic valve 122e in response to the detection signals. Thus, the water level is controlled to be automatically set at the reference boundary surface.

Next, the operation of the latent heat accumulation system according to this embodiment with the above structure is explained. Referring to FIGS. 9 and 10, when the suction pump 121 is driven by mainly utilizing cheap electric power during the nighttime hours, the refrigerant 501 or the second liquid which is stored in the storage portion 110a formed in the bottom portion of the water tank 110 is forcedly supplied upwardly to the water/liquid separation device 122 via the supply pipe 119. In the water/liquid separation device 122, cold water 500 or first liquid mixed in the refrigerant 501 although small in amount is separated from the refrigerant. As explained with reference to FIGS. 12 and 13, the separated cold water 500 is returned to the water tank 110 via the drain pipe 122f and the high purity refrigerant 501 is supplied to the refrigerator 118. The refrigerator 118 cools the refrigerant 501 fed from the water/liquid separation device 122 to a temperature lower than the freezing point (0° C.) of water (the first liquid). The cooled refrigerant 501 is fed to the plurality of tank units of the water tank 110 via the delivery pipe 123 and injected from the injection nozzles 124 into the cold water 500 in the respective tank units simultaneously or with a time delay. As a result, the cold water 500 is subjected to the heat exchange with respect to the refrigerant 501 which is injected from the injection nozzles 124 and kept at an extremely low temperature.

In this case, the injection nozzles 124 are set in sufficiently high positions from the bottom surface of the water tank 110 so as to permit the refrigerant 501 injected from the nozzles and the cold water 500 to be fully subjected to the heat exchange with each other. For example, the injection nozzles 124 are set above and apart at least 0.5 m from the boundary surface between the first and second liquids. With this arrangement, the temperature of the refrigerant 501 may be raised to substantially the same temperature as the water by the time it reaches the storage portion 110a on an bottom portion of the water tank 110. Thus, the efficiency of heat exchange by the refrigerant 501 higher than 95% can be attained.

Further, in the water tank 110, ice 502 is stored in position above the injection nozzles 124. It should be noted that since the injection nozzles 124 are not set at unnecessarily high positions in the water tank 110, a sufficiently large amount of ice 502 can be obtained in the water tank 110 and the sherbet-state ice 502 which can easily thaw can be stably made.

As shown in FIGS. 12 and 13, since the inlet port 122b and the outlet port 122c disposed in position lower than the inlet port 122b are formed in the tank 122a of the water/liquid separation device 122, the refrigerant 501 supplied from the storage portion 110a of the water tank 110 and fed via the supply pipe 119 is fed into the tank 122a via the inlet port 122b. At this time, the refrigerant 501 is discharged from the outlet port 122c while generating a vortex in the tank 122a. Therefore, after the cold water 500 whose specific gravity is small is collected into the center of the vortex by the centrifugal separation process, the cold water 500 rises due to the buoyancy thereof and is then discharged from the outlet port 122c of the tank 122a towards the refrigerator 118. Thus, the refrigerant 501 and the cold water 500 can be automatically separated from each other with high efficiency without using a special separation film or device.

As shown in FIG. 11, the vortex preventing portion 110b is provided so as to prevent a vortex from being generated at the suction portion when the refrigerant 501 is drawn from the storage portion 110a of the water tank 110 via the supply pipe 119. The vortex preventing portion 110b is disposed above the storage portion 110a of the water tank 110. The vortex preventing portion 110b is in the form of a porous plate. Further, the guide 119a for defining the intake direction of the refrigerant 501 is disposed on the inlet port 119a provided at the front end portion of the supply pipe 119. Therefore, the necessary depth of the storage portion 110a can be reduced and the amount of cold water 500 contained in the refrigerant 501 flowing into the supply pipe 119 can be significantly reduced.

As shown in FIGS. 9 and 10, the sherbet-state ice 502 which can easily thaw is stored in the water tank 110. The ice 502 can rapidly thaw by spraying water which is warmed by carrying away heat from the cooling loads in the respective rooms or the building onto the sherbet-state ice 502. Immediately after the ice 502 has thawed, ice 502 rises towards the surface so that cold water can be rapidly obtained.

As described above, according to this embodiment, the high efficiency, stable operation, high controllability, simplicity, high-speed thawing property, direct water-intake ability and the like which are indispensable conditions for the ice heat accumulation device in the large-scale regional heat supply plant can be satisfied. That is, in the large-scale regional heat supply plant installed in the underground of a midtown area and constructed by a large-capacity heat pump, water tank, water conveying pumps, flow control valves, a calorimeter and the like, the heat accumulation capacity can be increased to several times that of the conventional case by improving the conventional water tank without deteriorating the usability of the plant. Further, in the novel plant, the total effect including the effect that the necessary area for the plant can be reduced can be attained.

Thus, the ice making efficiency can be enhanced by 20 to 40% in comparison with the conventional ice heat accumulation device, the thawing speed is sufficiently high, direct water-intake from the water tank and water return to the water tank can be attained to enhance the usability, the controllability can be enhanced and ice can be additionally made. Further, in the intermediate periods of a year such as the spring and autumn, cold water can be made, the same efficiency as in the conventional case can be attained, and the device can be made extremely simple in construction and be easily maintained.

Further, it is possible to additionally adapt the device for the conventional water circulating type device as an ice heat accumulation device for each building, and in this case, not only the effect that ice can be additionally made but also the effect that a special control is not required and that inspection and maintenance service can be made easy can be attained.

Figure 14:
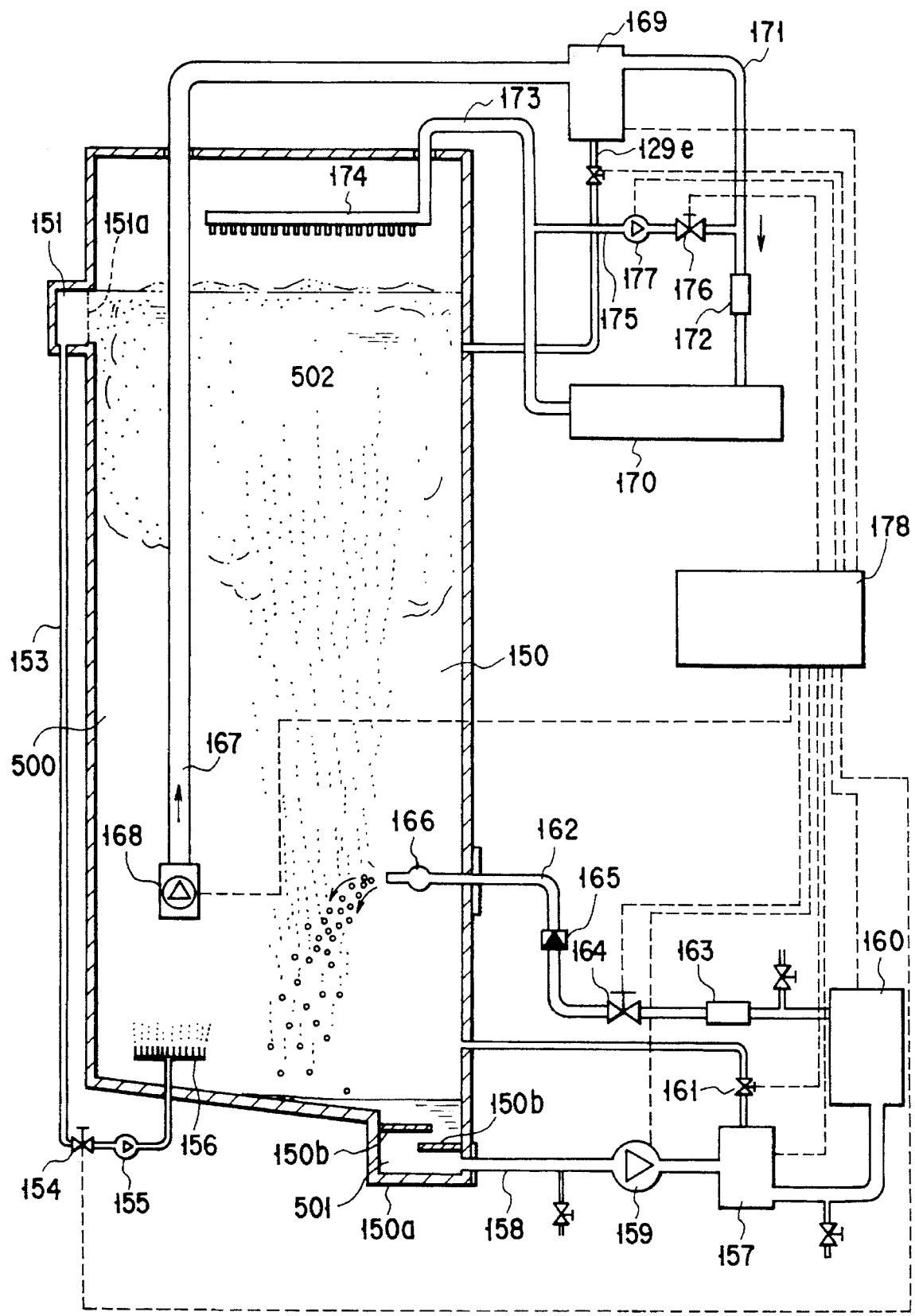
FIG. 14 is a cross sectional view of the main portion of a latent heat accumulation system according to a second embodiment of this invention in a case where it is disposed on the rooftop of a building.

Next, a latent heat accumulation system according to another embodiment of this invention is explained with reference to FIG. 14. FIG. 14 shows the construction of an ice heat accumulation device disposed on the rooftop of a building. As shown in FIG. 14, a water tank 150 is disposed on the rooftop of the building and stores therein cold water 500 as a first liquid and a refrigerant 501 as a second liquid having a larger specific gravity. The water tank 150 is made long in the height direction, the bottom surface of the water tank has an inclined surface and a storage portion 150a for storing the refrigerant 501 is formed in the lower end portion of the inclined surface. A pair of vortex preventing portions 150b each formed of a porous plate for preventing the occurrence of a vortex caused by introduction of the refrigerant 501 are mounted in the storage portion 150a in different positions in the vertical direction. Further, a plurality of water-intake portions 151 are formed on the upper portion of the water tank 150. In the open surface of the water-intake portion 151 which faces the inside portion of the water tank, a separator 151a formed of a wire mesh for separating the water 500 from ice 502 and drawing out only the water 500 is disposed. An annular water-intake portion continuously formed on the peripheral surface of the water tank can be used instead of the water-intake portions.

One end portion of a pipe 153 disposed to vertically extend outside the water tank is connected to the discharging port of the water-intake portion 151. The other end portion of the pipe 153 is connected to a pump 155 via a control valve 154. Further, the pump 155 is connected to a water spraying device 156 via a pipe. The pipe passes through the bottom wall of the water tank in a watertight manner. The water spraying device 156 is disposed in position near the bottom surface in the water tank and above the boundary surface between the refrigerant 501 and cold water.

A water/liquid separation device 157 is connected to a supply pipe 158 which is connected to the storage portion 150a via a pump 159. The water/liquid separation device 157 intakes the refrigerant 501 from the storage portion 150a and the refrigerant in the water/liquid separation device 157 is compressed by the pump 159. The water/liquid separation device 157 separates water from the compressed refrigerant 501 and supplies the refrigerant to a refrigerator 160. The water separated by the water/liquid separation device 157 is returned into the water tank via a control valve 161.

The refrigerator 160 is disposed in the same position level as the water tank 150. The refrigerator 160 serves to cool the refrigerant 501 from which water is removed by the water/liquid separation device 157. A discharging pipe 162 which is formed to pass through the side wall of the water tank in a watertight manner is connected to the refrigerator 160. A flow meter 163, flow control valve 164 and check valve 165 are connected in this order to the discharging pipe 162. A nozzle 166 is connected to the end portion of the discharging pipe 162 which is disposed inside the water tank. In this case, the nozzle 166 has at least one discharging hole. The nozzle 166 is disposed in position above the water spraying device 156. The nozzle 166 is separated at least 0.5 m from the bottom surface of the water tank or the boundary surface between the water and the refrigerant. The direction and discharging speed of the nozzle 166 are determined so as not to prevent the refrigerant 501 discharged from the side portion of the water tank from reaching the water spraying device 156. Thus, the refrigerant 501 cooled by the refrigerator 160 is injected from the injection nozzle 166 into the cold water in the water tank 150 via the flow meter 163, flow control valve 164 and check valve 165.

If the operation of the liquid supply pump 159 of the refrigerator 160 is interrupted for some reason, the cold water 500 in the nozzle 166 flows backward in the circulating system of the cold refrigerant 501. In this case, there occurs a possibility that freezing or solidification occurs inside the internal portion of the circulating system. The check valve 165 is provided to solve the above problem that freezing or solidification occurs inside the internal portion of the circulating system. A cold water supply pipe 167 is formed so as to pass through the upper portion of the water tank 150 and extend downwardly into the water tank. A water-intake pump 168 is mounted on the end portion of the cold water supply pipe 167 inserted into the water tank. Further, the end portion of the cold water supply pipe 167 lying outside the water tank is connected to a separation device 169. Like the water/liquid separation device 157, the separation device 169 utilizes the separation process according to the difference between the densities by use of the centrifugal force. When supplied with cold water in the water tank drawn by the water-intake pump 168, the separation device 169 removes the refrigerant 501 contained in the received cold water and supplies the cold water to an air-conditioning load 170 via a water supply pipe 171. A calorimeter 172 for measuring the amount of heat consumed by the air-conditioning load 170 is disposed in the water supply pipe 171. The air-conditioning load 170 is not necessarily limited to a single system, and in most cases, a plurality of systems are independently disposed.

Further, a water spray device 174 is arranged in a space in the upper portion of the water tank 150. The water spray device 174 feeds back the cold water subjected to the heat exchange by the air-conditioning load into the water tank via a returning pipe 173. The spraying device 174 has a plurality of cold water spraying ports.

The intermediate portion of the water supply pipe 171 for connecting the separation device 169 to the air-conditioning load 170 is branched. The branched portion is connected to the returning pipe 173 via a bypass pipe 175. A flow control valve 176 and a pump 177 are provided in the pipe 175. The pipe 175, flow control valve 176 and pump 177 are combined to form a water supply temperature adjusting line.

An air-conditioning control device 178 controls the above various pumps, control valve, separator, refrigerator according to the temperatures of various points and the position of the boundary surface between the refrigerant 501 and water. By the above control operation, the air-conditioning in the building and the operation of the various devices in the heat supply plant can be controlled. Further, in this embodiment, the open/closed state of the valve 154 is controlled by the air-conditioning control device 151. Thus, the water-intake portions 151 are controlled so as to be sequentially activated in each preset period so as to store the ice 502 uniformly in the water tank. Further, the refrigerant 501 can be automatically supplemented by use of a supplementing device (not shown).

Next, the operation of the ice heat accumulation device with the above construction is explained, but the explanation for the same process as explained in the former embodiment is omitted and only the particular process in this embodiment is explained. The ice heat accumulation device with the above construction shown in this embodiment is effective when it is used in a place where no limitation is imposed on the height, for example, when it is disposed on the rooftop of a building since the water tank 150 is made long in the height direction. That is, the volume of the ice making portion (a portion below the injection nozzle 166) in the water tank can be made relatively small in comparison with that of the ice storing portion (a portion above the injection nozzle 166). Therefore, the ice-filled rate can be enhanced.

Further, when the flow control valve 154 is opened and the pump 155 is operated, water near the sherbet-state ice 502 is sprayed into the water tank by the water spraying device 156 and upward flow of water is created in the water tank. Therefore, fine particles of ice 502 are carried by the flow of water sprayed from the water spraying device 156, rise to the upper portion of the water tank, and are combined with the assembly of the sherbet-state ice 502.

Thus, the ice assembly 502 grows, and water sprayed from the returning pipe 174 is passed through the ice assembly 502 so as to increase the assembling density of the ice assembly. As a result, the filling rate of the ice 502 is increased, thereby enhancing the space efficiency of the device.

Cold water drawn by the water-intake pump 168 flows into the separation device 169 via the supply pipe 167. Then, the refrigerant 501 contained in the cold water although small in amount is separated by application of the centrifugal force in the separation device 169 in the same manner as in the water/liquid separation device 157 and collected. As a result, high purity cold water is supplied to the air-conditioning load 170. Thus, the refrigerant 501 can be prevented from flowing into the air-conditioning load 170. As a result, the ice making operation can be stably effected for a long period of time.

The water subjected to the heat exchange with the air-conditioning load 170 is returned to the spraying device 174 and then sprayed over a wide area on the ice assembly 502. The water intake position by the water-intake pump 168 is set in substantially the same position as the mounting position of the injection nozzle 166 so that the thawing efficiency can be kept high.

Further, the refrigerant 501 is supplied to the refrigerator 160 via the water/liquid separation device 157 by the operation of the circulating pump 159. Even if the operation of the circulating pump 159 is interrupted for some reasons when the refrigerant 501 cooled by the refrigerator 160 is injected into the water tank by the injection nozzle 166, cold water in the water tank can be prevented from flowing into the circulating system by the operation of the check valve 165 provided in that portion of the discharging pipe 162 which lies between: the refrigerator 160 and the injection nozzle 166, thereby making it possible to prevent occurrence of solidification in the circulating system.

As described above, in this embodiment, the device can be safely operated with high efficiency like the first embodiment, the controllability is excellent, the construction is simple, the maintenance is easy, and the thawing efficiency is high, and thus an ice heat accumulation device whose useability is high can be obtained. Particularly, the device of this embodiment is effective when used in a place where no severe limitation is imposed on the height thereof or on the rooftop of a building.

Next, in the above embodiment, the measure taken to prevent freezing in the injecting portion of the injection nozzle 166 is explained with reference to FIGS. 15 to 17. In a case where the second liquid (refrigerant) cooled to a temperature lower than the solidifying point (freezing point) of the first liquid (cold water) is injected into the cold water, the temperature of the injecting end portion of the injection nozzle is set to the same temperature of the refrigerant if no measure is taken. Therefore, the cold water in contact with the injecting end portion is frozen. As a result, the ice 502 starts to grow in a tubular form with the frozen water as a core. If the condition is kept unchanged, no serious problem will occur, but if fine ice particles are formed and suspended in the water of the water tank or curdy combination of ice particles is attached to the tubular-form ice 502 while being suspended, the ice further grows, thereby causing a problem. As a result, a large mass of ice 502 is formed with the nozzle set at the center. Then, the heat accumulation medium of low temperature leaks into the internal portion of the nozzle. The ice 502 is hard and low in temperature and has no thawing ability, thereby lowering the ice making efficiency.

Therefore, it is extremely important to prevent solidification or freezing of the cold water in the nozzle portion. FIG. 15 shows the structure of a double spraying nozzle with a convection preventing plate and a path for supplying the refrigerant for the nozzle. As shown in FIG. 15, the supply system for the refrigerant 501 is constructed by two branch lines including a line 158*a* for supplying the refrigerant which is compressed by the pump 159 to a refrigerator (not shown) and a line 158*b* formed to extend to the water tank. The injection nozzle 166 includes a central nozzle 166*a* for injecting a refrigerant, an outer nozzle 166*b* for injecting a refrigerant of relatively high temperature, and a convention preventing plate 166*c* formed in substantially the same plane as the above nozzles and integrally formed with the outer nozzle 166*b*. In this case, a plurality of injection nozzles 166 with the above construction are provided in the water tank. Single nozzle headers 166*d*, 166*e* for supplying refrigerants to the respective nozzles may be commonly provided for a group of nozzles. Further, the line for supplying the refrigerant of low temperature from the refrigerator and the nozzle portion are thermally insulated.

when the above freezing preventing means is provided for the injection nozzle 166, the refrigerant of relatively high temperature is injected in such a form to surround the refrigerant of low temperature. Therefore, the front end portion of the nozzle at the low temperature is not set in contact with the cold water, thereby making it possible to prevent the solidification in the nozzle portion by the cold water attached thereto.

FIG. 16 shows the structure having an electric heater 166*h* as the freezing preventing means for the injection nozzle. Like the case of FIG. 15, in the case shown in FIG. 16, the convection preventing plate 166*c* is disposed in the same plane as the refrigerant injection nozzle. The electric heater 166*h* is disposed on the front end portion of the nozzle which is set in direct contact with the water in the water tank. Cables 166*i* are connected to the electric heater 166*h* so that the electric heater can be energized by the external power source (not shown). In this example, since the electric heater 166*h* and cables 166*i* are used in the water, they are waterproofed and the cables 166*i* are laid mainly inside the heat insulation material 166*f* of the pipe line and then lead out to the exterior.

By using the above freezing preventing means and energizing the electric heater 166*h* to heat the front end portion of the nozzle, the temperature of the front end portion can be kept at a temperature higher than the freezing point of the cold water so that the cold water can be prevented from being frozen. In this case, the electrical heating may be effected continuously or periodically, but if it is excessively heated, a loss of ice making occurs, and therefore, it is desirable to adjust the surface temperature of the electric heater 166*h* to be set several degrees C. (°C.) higher than the freezing point of the cold water.

FIG. 17 shows the structure having a mechanism for mechanically wiping the front end surface of the nozzle as the freezing preventing means for the injection nozzle. As shown in FIG. 17, a freezing preventing wiper mechanism 166*j* which is the same as the mechanism for wiping the windshield of a car is disposed on the convection preventing plate 166*c* arranged on the front surface of the injection nozzle 166.

With the injection nozzle having the above freezing preventing means, the ice 502 can be mechanically wiped away before the cold water freezes and grows on the nozzle portion by always operating the wiper mechanism 166*j*. Thus, adhesion of the ice due to the freezing of the cold water can be prevented. Particularly, the wiper mechanism is effective when the electrical heating is not effected. When the wiper mechanism 166*j* is used together with the structure shown in FIGS. 15 or 16, a more significant effect can be attained.

Figure 15:
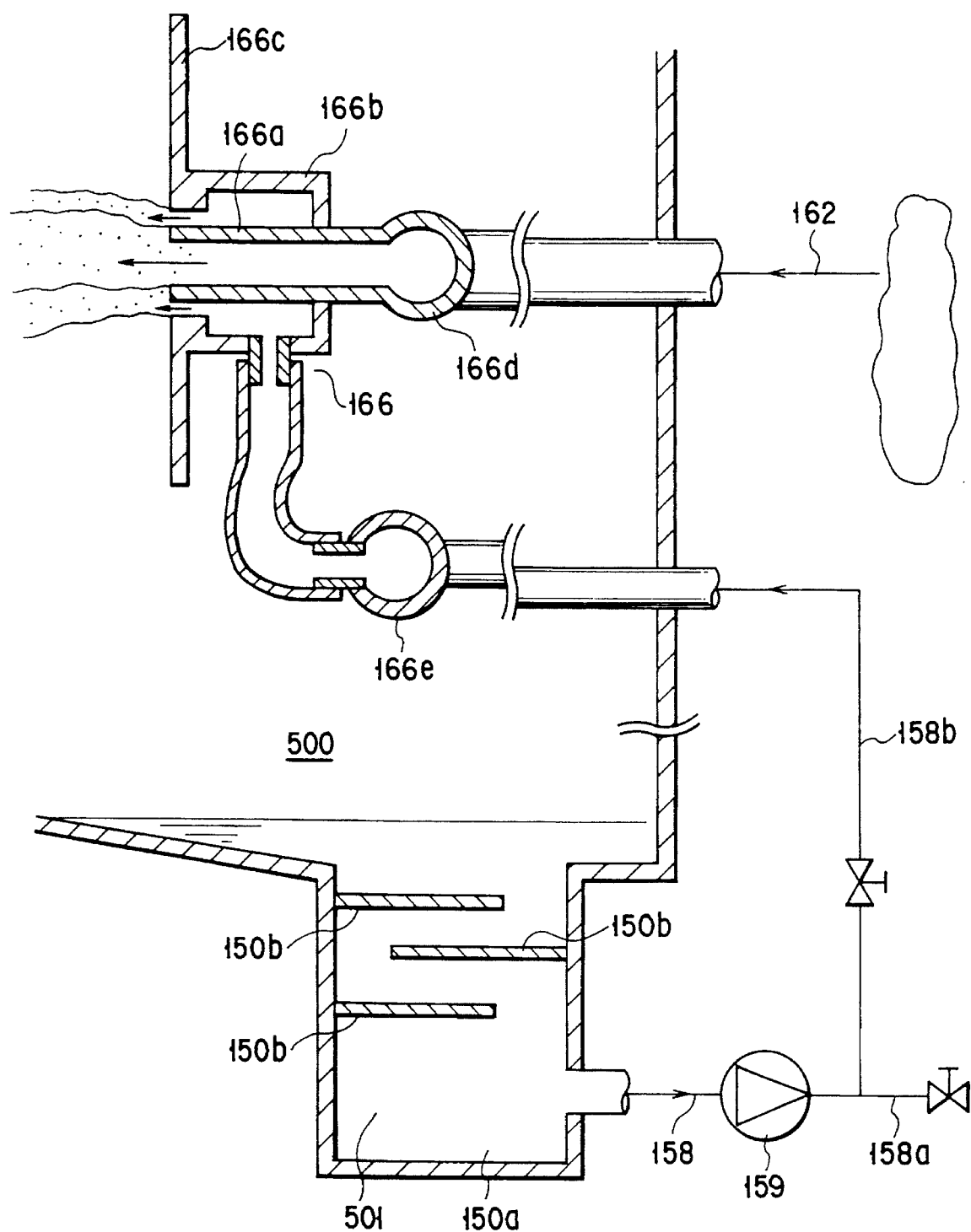
FIG. 15 is a cross sectional view showing a first example of the construction of an outlet nozzle portion for refrigerant used in the latent heat accumulation system of the same embodiment.
Figure 21:
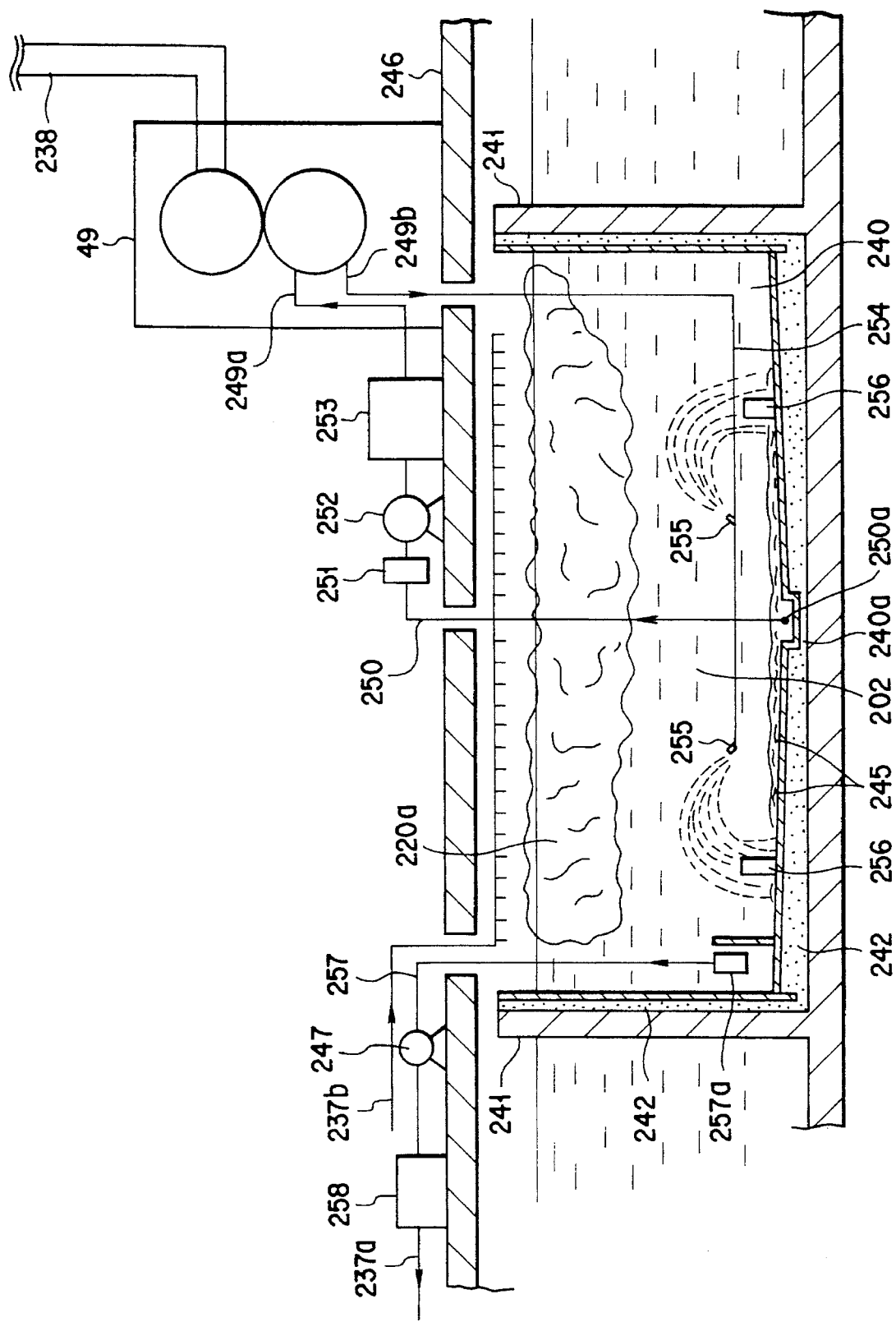
FIG. 21 is a view showing the construction of still another embodiment of this invention applied to an air-conditioner shown in FIG. 9.

Thus, as shown in FIGS. 15 to 17, the sherbet-state ice 502 can be stably and continuously obtained with high efficiency by using a structure for preventing the freezing of cold water on injection nozzle by use of warm fluid, electric heater or mechanical wiper.

Further, this invention is not limited to the constructions shown in the above embodiments, and various modifications can be obtained to further enhance the function thereof by replacing part of the construction by the other part or adding the other part to the construction.

Examples of the modifications are explained below.

(1) In the above embodiment, a fluorinert-series inactive liquid which does not contain hydrogen and chlorine and has characteristics that the specific gravity is equal to or larger than 1.7 at 0° C., the solidifying point is −30° C. or lower and the boiling point is 75° C. or higher may be used as the second liquid.

(2) In the above embodiment, a fluorinert-series inactive magnetic fluid which does not contain hydrogen and chlorine and has characteristics that the specific gravity is equal to or larger than 1.7 at 0° C., the solidifying point is −30° C. or lower and the boiling point is 75° C. or higher may be used as the second liquid. In this case, a magnetic field generation device may be disposed near the injection nozzle to speed up separation between the magnetic fluid and water.

(3) In the above embodiment, it is possible to provide a circulating system exclusively used for the first liquid for measuring the temperature of water in the water tank and supplying the water from the water tank to the refrigerator, cooling and collecting the water according to the measured temperature.

(4) In the above embodiment, a supply/collection system for supplying the refrigerant cooled by the refrigerator to a plurality of water tanks is mainly constructed by pipes, pumps and switching control valves. The refrigerant may be supplied/collected to or from the plurality of water tanks simultaneously or with time delay by controlling the supply/collection system by use of the air-conditioning control device. In this case, the switching operation of the supply/collection system may be automatically effected according to the amounts of ice made and stored in the respective water tanks or a signal output from a measuring unit for measuring the temperature of water in the water tanks.

(5) In the above embodiment, an accumulation mechanism for accumulating ice made in the water tank is disposed in the water tank. A mixture of water and ice which is accumulated by the ice accumulation mechanism and whose filling rate is relatively high is fed to a carrying system constructed by pipes and pumps. Thus, the mixture (fluid) can be fed to a desired destination, and it becomes possible to feed the ice and water in the two-phase flow state to a storing water tank or cooling load disposed at a remote place or high place.

Next, another embodiment of this invention is explained with reference to the accompanying drawings. FIG. 18 is a view showing the construction of the embodiment of this invention. As shown in FIG. 18, water 202 and a non-freezing liquid (refrigerant) 203 which is not water-soluble and has a specific gravity larger than 1 are stored in a water tank 201. A water pump 204 is connected to the side portion of the water tank 201 in an intermediate position in the height direction to circulate the water. A non-freezing liquid pump 205 is connected to the side portion of the water tank 201 in a lower position in the height direction to circulate the refrigerant. An evaporator 207, compressor 208, condenser 209 and expansion valve 210 constitute the main portion of the refrigerator. The heat of cold water 211 is radiated via a radiator (not shown) of the condenser 209. The non-freezing liquid pump 205 is connected to the evaporator 207 via a separation tank 206 and electromagnetic valve 214. The water pump 204 is connected to the evaporator 207 via an electromagnetic valve 215. A temperature detector 212a serves to detect the temperature of water 202 in the outlet port of the evaporator 207. A temperature detector 212b serves to detect the temperature of water 202 in the inlet port of the evaporator 207. Reference numeral 213 denotes a control device.

The separator 206 has a porous floating plate 217 which is formed of a material having a specific gravity smaller than that of the non-freezing liquid 203 and larger than that of the water 202 and is set to float in the boundary surface between the water 202 and non-freezing liquid 203 in a tank 216 as shown in FIG. 19. When water 202 is accumulated in the tank 216 and the floating plate 217 sinks and reaches a preset height, the position of the floating plate is detected by a detector 218. Then, the detector outputs a signal to cause the control device 213 to open an electromagnetic valve 219 disposed on the upper portion of the tank 216, thereby draining the water. Pipes respectively connected to the non-freezing liquid pump 205 and electromagnetic valve 214 are provided in the lower portion of the tank 216. Further, an opening (not shown) which is in communication with the atmosphere is formed in the upper wall of the tank 216.

Next, the operation of the embodiment with the above construction is explained. When the temperature of the water 202 in the water tank 201 is high (20° to 30° C.), the electromagnetic valve 215 is opened and the water pump 204 is driven to draw out the water 202 stored in the water tank 201 and supplies the same to the evaporator 207. At this time, the non-freezing liquid pump interrupts its own operation and the electromagnetic valve 214 is closed. The outlet temperature (or inlet temperature) of the water 202 of the evaporator 207 is detected by the temperature detector 212a (or temperature detector 212b), and when the detected temperature is lowered to a level (which is different according to the capacity of the refrigerator and is 3° to 5° C., for example) close to and above the solidifying point of the water 202, the electromagnetic valve 215 is closed, the operation of the water pump 204 is interrupted, the electromagnetic valve 214 is opened, and the non-freezing liquid pump 205 is driven to supply the non-freezing liquid 203 collected from the lower portion of the water tank 201 directly to the evaporator 207 under the control of the control device 213. The cooled non-freezing liquid 203 is directly injected into the water 202 in the water tank 201. As a result, the water 202 is cooled and ice 220 is made. When the water 202 is accumulated and rises to a high level in the separator 206, the electromagnetic valve 219 is opened to drain the water (to the water tank 201 or to the exterior).

According to the embodiment with the above structure, in the case where water of a high temperature is cooled, the water in the water tank can be rapidly cooled and the performance of the refrigerator can be utilized to the maximum degree since water which is excellent in the heat carrying property can be directly supplied to the evaporator.

This invention is not limited to the above embodiment and can be modified as shown in FIG. 20. The embodiment shown in FIG. 20 is similar to the above embodiment except that an ice maker 221 is disposed in position higher than the water tank 201, the inlet port of a non-freezing liquid pump 205 is connected to the bottom portion of the ice maker 221, a pipe is disposed on the outlet port side of the water pump 204 to extend parallel to the pipe connected to the evaporator 207, and the pipe is connected to the ice maker 221 via an electromagnetic valve 222. The inlet port side of the water pump 204 is connected to the side portion of the water pump 204 in a lower position in the height direction. The compressor, condenser and expansion valve are not shown.

Next, the operation of the embodiment is explained. When the temperature of the water 202 in the water tank 201 is high (20° to 30° C.), the electromagnetic valve 215 is opened and the water pump 204 is driven to draw out the water 202 from the side portion of the water tank 201 and supply the same to the evaporator 207 which in turn cools the received water, and the thus cooled water is fed into the water tank 201 via the ice maker 221. At this time, the electromagnetic valve 214 is closed. Like the case of the above embodiment, when the temperature detected by the temperature detector 212a (or temperature detector 212b) is lowered to a level close to and above the solidifying point of the water, the electromagnetic valve 215 is closed and the electromagnetic valve 222 is opened to supply the water 202 into the ice maker 221. Next, the electromagnetic valve 214 is opened and the non-freezing liquid pump 205 is driven to supply the non-freezing liquid 203 collected from the lower portion of the ice maker 221 to the evaporator 207. The non-freezing liquid 203 cooled in the evaporator 207 is injected into the ice maker 221 so as to be brought into contact with the water 202, and as a result, the water 202 flowing into the ice maker 221 will be cooled and ice 220 can be made. The cooled water 202 and the thus formed ice 220 are supplied into the water tank 201. Therefore, in this embodiment, the same effect as in the above embodiment can be obtained.

Next, another embodiment of this invention is explained with reference to FIGS. 21 to 24. The embodiment shown in FIGS. 21 to 24 can be applied to the multistoried building shown in FIG. 9. FIGS. 21 to 24 show a water tank disposed in the basement of the multistoried building.

A water tank 240 is divided into compartments by a plurality of partition plates 241 having communication holes (not shown) formed therein, a heat insulating layer 242 is formed on the bottom portion and inner side walls of each compartment, and the bottom portion has an inclined surface and a groove 240a in the lowest portion in which a magnetic fluid which will be explained later is deposited by its own weight and collected. A water pipe 257, for supplying heat to the neighboring multistoried buildings (not shown) is connected to the water tank 240a via a water conveying device and closing valve (not shown.). The water pipe 257 is laid via an underground multi-purpose duct (not shown). Water 202 and a magnetic fluid 245 which is a non-freezing refrigerant, which is not water-soluble and which has a specific gravity larger than the water 202 are mixed and stored in the water tank 240. Since the magnetic fluid 245 has a specific gravity larger than the water 202, it is generally deposited in the bottom portion of the water tank 240 including the groove 240a.

A floor 246 is formed on the upper portion of the basement of the multistoried building to cover the water tank section including the water tank 240. A pump 247 and a heat pump 258 constituting a cold/warm water supply system are disposed on the floor 246. The pump 247 and heat pump 258 are connected to the supply pipe 237a and return pipe 237b via a valve (not shown). Further, a refrigerator 49 is disposed on the floor 246. The evaporator inlet port 249a of the refrigerator 49 is connected to a supply pipe 250 which has a suction port 250a for the magnetic fluid 245 or refrigerant formed at the front end portion and which is formed to extend into the groove 240a in the bottom portion of the water tank 240. The supply pipe 250 is connected to a strainer 251, pump 252 and water separation device 253 in this order. Further, the evaporator outlet port 249b of the refrigerator 49 is connected to a discharging pipe 254 which is disposed to horizontally extend near the bottom surface of the water tank 240. A plurality of injection nozzles 255 are connected to the front end portion and intermediate portion of the horizontally extending portion of the pipe 254 with the injection direction set in the upward oblique direction at a preset angle. Magnetic field generation devices 256 are disposed below the injection nozzles 255. The magnetic field created by the magnetic field generation device 256 acts on the magnetic fluid 245 discharged from the injection nozzle 255 so that the magnetic fluid can be rapidly deposited on the bottom surface after the magnetic fluid 245 is subjected to the heat exchange with the water 202.

Figure 23:
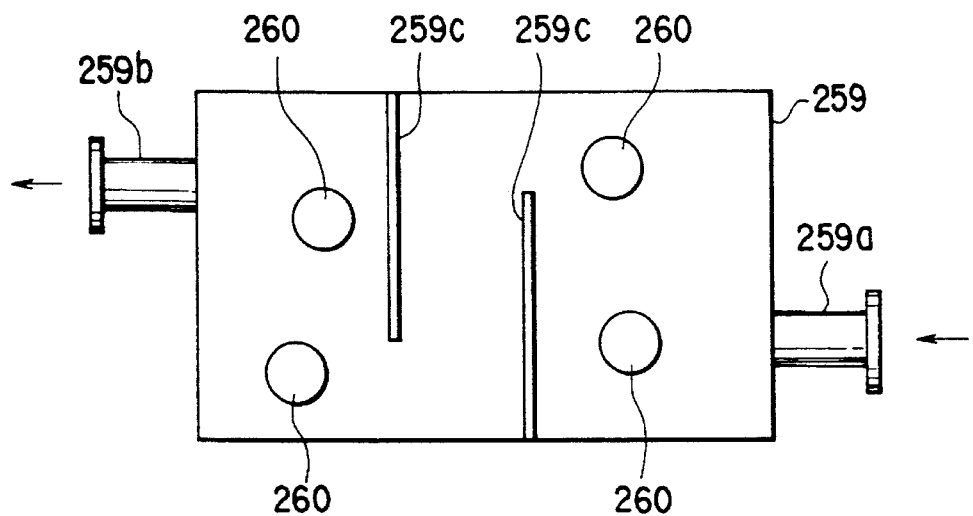
FIG. 23 is a plan view showing the construction of a separation tank used in the embodiment shown in FIG. 21.
Figure 24:
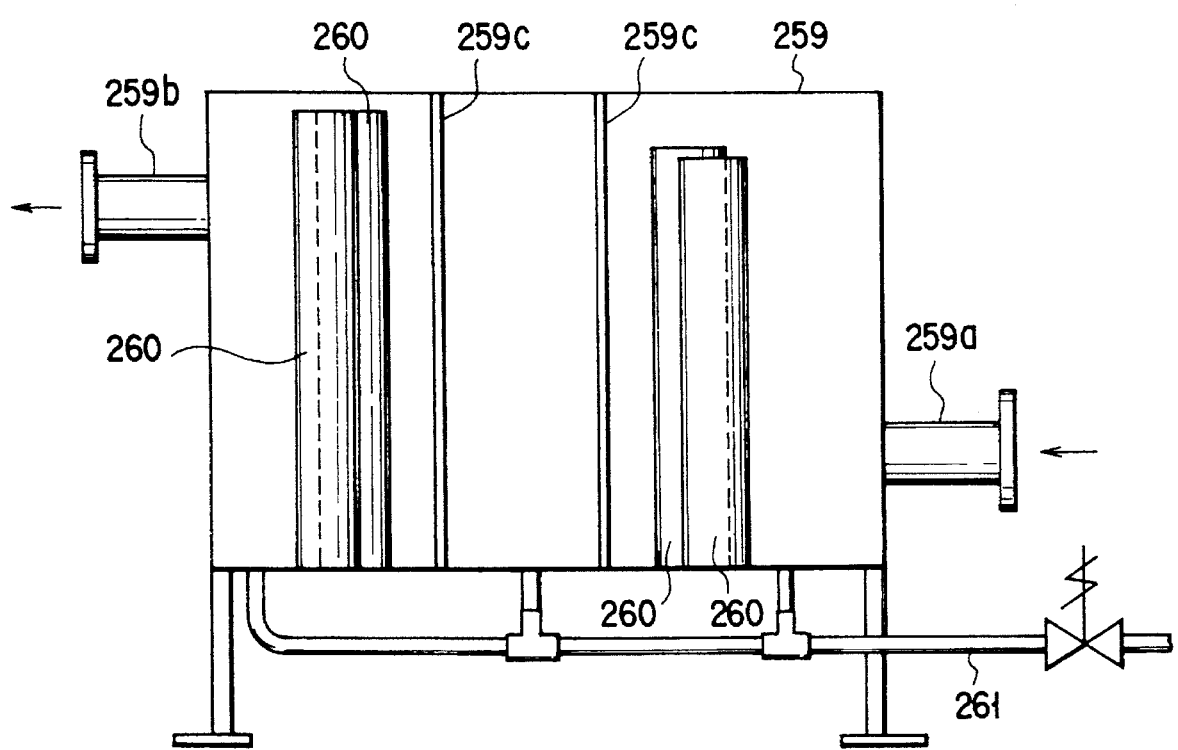
FIG. 24 is a cross sectional view of the tank shown in FIG. 23.

A water-intake pipe 257 of the cold water circulating system for supplying water 202 drawn out from the water tank 240 to a multistoried building 101 or neighboring multistoried buildings (not shown) is disposed so as to extend to a position near the bottom surface of the water tank 240. A water-intake portion 257a is mounted on the front end portion of the water-intake pipe 257, and the water-intake pipe 257 is connected to the pump 247 and to a separation tank 258 for the magnetic fluid 245. The separation tank 258 serves to attract and separate the magnetic fluid 245 contained in the water 202 although small in amount by the magnetic action and collect the thus separated magnetic fluid. As shown in FIGS. 23 and 24, an inlet pipe 259a connected to the water-intake pipe 257 and an outlet pipe 259b connected to the supply pipe 237a for the air-conditioning circulating water are formed in the respective side walls of the separation tank 258. The separation tank 258 includes a tank 259 having partition plates 249c formed in the central portion thereof to curve the passage, a plurality of magnetic field generation devices 260 disposed in the tank 259, and a collection pipe 261 for collecting magnetic fluid 245 attracted and separated by the magnetic field generation devices 260.

The magnetic field generation device 256 disposed near the injection nozzle 255 and the magnetic field generation device 260 disposed in the separation tank 258 of the water-intake pipe 257 in the cold water circulating system use electromagnets. The operation of the magnetic field generation devices 256 and 260 can be freely turned on or off by the electrical ON/OFF control. However, the magnetic field generation device 260 is constructed by a combination of a permanent magnet and an electromagnet which are concentrically disposed, for example, and the magnetic field is set up only by the permanent magnet in the normal time and when a certain amount of magnetic fluid 245 contained in the circulating water is trapped, the electromagnet is energized to cancel the electromagnetic field by the permanent magnet.

Therefore, in the magnetic field generation device 260, the magnetic fluid 245 is trapped only by the permanent magnet without energizing the electromagnet in the normal mode. However, when the trapped magnetic fluid 245 is collected, the electromagnet is energized to extinguish the magnetic field by the permanent magnet. Thus, the magnetic field generation device 260 releases the trapped magnetic fluid 245. The released magnetic fluid 245 is returned from the collection pipe 261 connected to the bottom portion of the separation tank 258 to the bottom portion of the water tank 240 via a pipe and pump (not shown). This operation is effected while the operation of the pump 247 is interrupted.

Next, the operation of the embodiment with the above construction is explained. As shown in FIG. 22, the magnetic fluid 245 injected from the injection nozzle 255 is actively mixed with the water 202 and subjected to heat exchange with the water by the action of the magnetic field created by the magnetic field generation device 256 disposed near the injection nozzle 255 for the magnetic fluid 245. However, the magnetic fluid 245 will not be suspended, guided along the magnetic field by the magnetic field generation device 256 and deposited on the bottom portion of the water tank 240. The magnetic field generation device 256 attracts and holds a certain amount of magnetic fluid 245. However, that part of the magnetic fluid 245 which has been deposited on the bottom portion is sequentially supplied to the refrigerator 49 via the supply pipe 250, cooled again, and then injected from the injection nozzle 255.

Even if the separation operation for the magnetic fluid 245 is effected, some of the magnetic fluid 245 may be still suspended in the water or sherbet-state ice 220a although small in amount. The suspended magnetic fluid 245 is trapped by the magnetic field generation device 260 disposed in the separation tank 258 of the water-intake pipe 257 in the cold water circulating system.

The trapped magnetic fluid 245 is attracted by permanent magnet of the magnetic field generation device 260 and accumulated on the lower surface portion thereof. The accumulated magnetic fluid 245 may be fed back into the bottom portion of the water tank 240. That is, when the operation of the suction pump 247 in the cold water circulating system is interrupted in a period in which no cooling load is applied, for example, during nighttime hours, the electromagnet in the magnetic field generation device 260 is energized to cancel the magnetic field generated by the permanent magnet of the magnetic field generation device 260 so as to extinguish the magnetic fluid attracting force of the magnetic field generation device 260. Thus, the magnetic fluid 245 can be returned to the bottom portion of the water tank 240 via the collection pipe 261 connected to the bottom portion of the separation tank 258. In the above explanation, the magnetic field generation device 260 disposed in the separation tank 258 is constructed by a combination of the permanent magnet and electromagnet which is selectively energized, but it is also possible to construct the magnetic field generation device 260 only by use of an electromagnet.

According to the embodiment with the above construction, a water tank for storing cold water together with a non-freezing liquid which is not water-soluble and has a specific gravity larger than water is disposed in the basement or on the rooftop of a multistoried building or neighboring outdoors. In an air-conditioning device including a water circulating system for forcedly circulating and supplying the water in the water tank to respective rooms of the building and a refrigerant circulating system for drawing the refrigerant from the water tank, cooling the same in a refrigerator and then returning the cooled refrigerant to the water tank, only the heat accumulation refrigerant is cooled in the refrigerator by use of cheap electric power during nighttime hours. The refrigerant is circulated in the water tank and subjected to the heat exchange with the water so as to partly change the water into sherbet-state ice and store heat in this state. During daytime hours, cold water is circulated into the rooms of the building to cool the respective rooms. The returned water which has become warm is mixed into the sherbet-state ice to melt the ice so as to enhance the heat exchange efficiency. In an ice heat accumulation device in which the water tank is made small and lightweight, since a magnetic fluid is used as the heat accumulation refrigerant and a magnetic field generation device is used, the problems, which are caused by the emulsion occurring after the heat accumulation refrigerant is injected into the water and the suspension phenomenon of the heat accumulation refrigerant for a long period of time in the conventional case, can be prevented.

Further, since a separation tank having the magnetic field generation device is disposed in the water supply section of the cold water circulating system to trap a magnetic fluid which is a heat accumulation liquid remaining although small in amount in the cold water supplied to the cooling load, the leakage of the magnetic fluid into the cold water circulating system can be prevented, thereby making it possible to attain the long-term stable operation.

As described above, according to this invention, since a passage switching device is provided between the refrigerator and the water tank, the water can be cooled from a high temperature of the water set when it is in the water tank to a temperature near the freezing point by directly supplying the water into the refrigerator, the performance of the refrigerator can be fully utilized, the water can be efficiently cooled and ice can be efficiently made. Further, the magnetic fluid is used as a non-freezing liquid and the magnetic field generation device is used in the water tank. Therefore, when the magnetic fluid cooled in the refrigerator is injected into the water tank, it cools the water, and when fine ice particles are formed, the magnetic fluid is attracted and separated by the magnetic field generation device. As a result, the problems which are caused by the emulsion occurring after the non-freezing liquid is injected into the water and the suspension phenomenon of the non-freezing liquid for a long period of time in the conventional case can be prevented, and the heat exchange efficiency can be enhanced and the device can be made small and lightweight.

Figure 25:
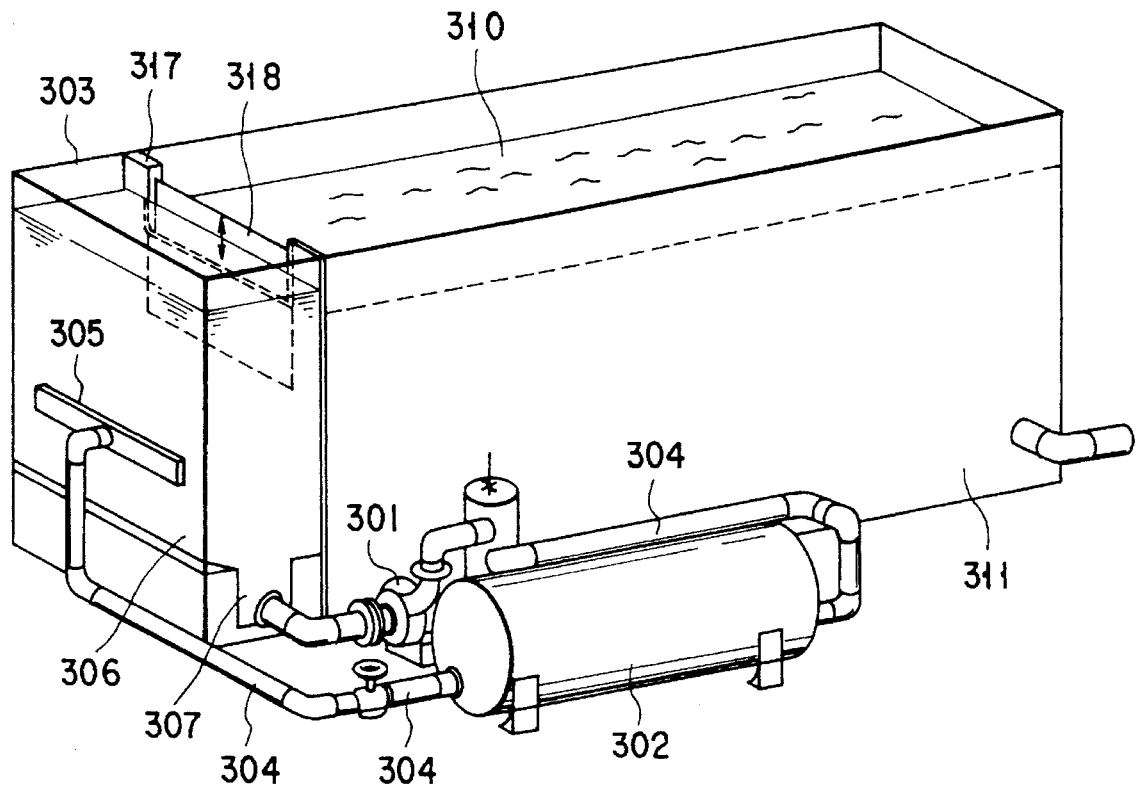
FIG. 25 is a view schematically showing the construction of a latent heat accumulation system according to this invention having an ice transferring device.
Figure 26:
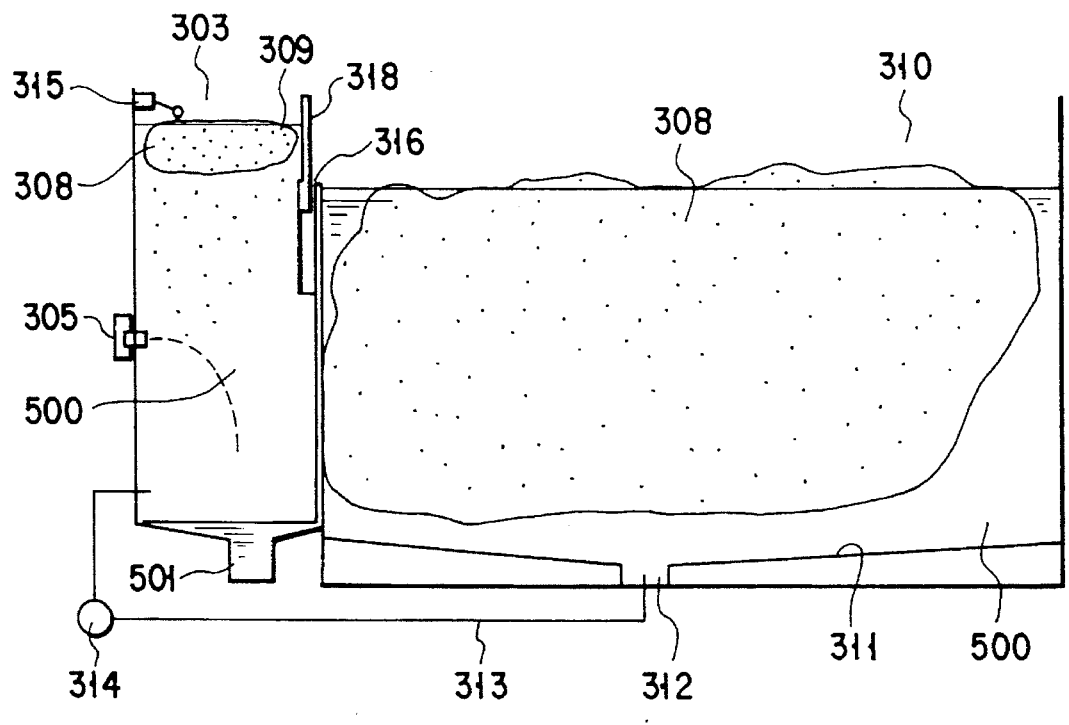
FIG. 26 is a cross sectional view of the latent heat accumulation system shown in FIG. 25.

Next, still another embodiment of this invention is explained with reference to FIGS. 25 and 26. As shown in the drawing, a refrigerant (such as Fluorinert) 501 which is a second liquid is drawn out by use of cheap electric power during nighttime hours and a pump 301 is driven to supply the refrigerant to a refrigerator 302. After the second liquid is cooled to a temperature lower than the solidifying point or freezing point (0° C.) of a first liquid which is water, the second liquid is injected from a plurality of nozzles 305 into the water 500 in a plurality of ice making tanks 303 simultaneously or with time delay. Thus, the cold of a heat accumulation liquid 501 serves to cool the water 500.

The nozzles 305 are disposed in positions which are sufficiently high to permit the refrigerant 501 injected into the ice making tank to be subjected to the full heat exchange with the water 500. That is, the nozzles 305 are disposed in positions approx. 0.5 m apart from the boundary surface between the first and second liquids. Therefore, the temperature of the refrigerant 501 rises to substantially the same temperature as the water (0° C. in the ice making state) by the time it reaches a storage portion 307 and the heat exchange efficiency by the refrigerant becomes approximately 100%.

In the ice making tank 303, sherbet-state ice 308 is stored in the form of a cloud in the upper portion 309. At this time, the volume filling rate of the ice is higher in a portion nearer to the water surface. Thus, during the ice making process, the refrigerant 501 is supplied together with the cold water 500 from a storage portion 312 for the heat accumulation liquid 501 formed in the bottom portion of an ice storage tank 310 into the ice making tank 303 via a pipe 313 and pump 314. As a result, the water level in the ice making tank 303 gradually rises. In this case, the water level in the ice storage tank 310 falls, but since the volume of the ice storage tank 310 is several times larger than that of the ice making tank 303, the degree of lowering in the water level in the storage tank is small.

When it is detected that the water level in the ice making tank 303 rises and reaches a preset level by means of a water level sensor 315 disposed in a preset position, a water gate plate 318 of a water gate portion 317 is moved downwardly and the sherbet-state ice 308 in the upper portion 309 of the ice making tank 303 flows as one unit into the ice storage tank 310 via a connecting portion 316. The connecting portion 316 is so formed as to have a downward path from the ice making tank 303 to the ice storage tank 310 so that the ice can smoothly flow into the ice storage tank without being stopped halfway.

The water gate plate 318 of the water gate portion 317 is gradually raised when water in the lowermost portion of the water gate portion 317 will completely have flowed out, and then water 500 is accumulated again. During this time, the ice making process is continuously effected.

As described above, in the above embodiment, when the sherbet-state ice is transferred, the water gate is opened according to the storage state of the sherbet-state ice so as to move the ice all at one time into the ice storage tank as a mass of ice like avalanche without lowering the volume filling rate of the ice. Therefore, the driving force necessary for transferring the ice is only the pumping power required for transferring water from the ice storage tank to the ice making tank, and since the mechanism of upward or downward movement of the water gate plate is used to permit the sherbet-state ice to move by its own weight, it is not necessary to transfer the ice by using a complicated transferring means. Further, if the water gate is formed to be long in the horizontal direction, it becomes possible to prevent the ice from being undesirable broken and prevent water from separately flowing into the ice storage tank.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A latent heat accumulation system for injecting a second fluid which does not combine with a first fluid, which has a specific gravity larger than that of the first fluid and which is cooled to a preset temperature level in the first fluid to produce a solid phase material of the first fluid by a solidification phenomenon of the first fluid and uses the latent heat of the solid phase material to cool an object to be cooled, which comprises:

a tank within which the solid phase material is formed, said tank having a hopper mechanism and a storage mechanism, the second fluid being stored in the hopper mechanism and the storage mechanism, the first fluid which is cooled by the solid phase material via a boundary surface with the second fluid;

a supply mechanism supplying the first fluid into said tank;

a drawing device drawing out the first fluid, stored in said tank and cooled by the solid phase material, to an exterior of said tank as a heat accumulation medium;

a collection device collecting the second fluid from the hopper mechanism and from the storage mechanism of said tank;

a nozzle disposed in a preset position above said boundary surface in said tank and spaced from said boundary surface a predetermined distance, said nozzle being directed in and upward direction so as to maximize heat exchange effectiveness between the first and second fluids, said nozzle injecting the second fluid into the first fluid stored in said tank so as to produce said solid phase material of the first fluid by the solidification phenomenon of the first fluid; and a refrigerating device provided between said collection device and said nozzle, said refrigerating device refrigerating the second fluid to be supplied to said nozzle to the preset temperature level.

2. A latent heat accumulation system according to claim 1, wherein said preset distance is substantially not less than 0.5 m when the first fluid is water and the second fluid is Fluorinate.

* * * * *